United States Patent
Zhang

(10) Patent No.: US 9,460,195 B1
(45) Date of Patent: Oct. 4, 2016

(54) SYSTEM AND METHODS FOR DETERMINING TERM IMPORTANCE, SEARCH RELEVANCE, AND CONTENT SUMMARIZATION

(71) Applicant: Guangsheng Zhang, Palo Alto, CA (US)

(72) Inventor: Guangsheng Zhang, Palo Alto, CA (US)

( * ) Notice: Subject to any disclaimer, the term of this patent is extended or adjusted under 35 U.S.C. 154(b) by 0 days.

(21) Appl. No.: 14/292,649

(22) Filed: May 30, 2014

Related U.S. Application Data

(63) Continuation of application No. 13/769,396, filed on Feb. 18, 2013, now Pat. No. 8,819,001, which is a continuation of application No. 12/972,462, filed on Dec. 18, 2010, now Pat. No. 8,407,217.

(60) Provisional application No. 61/306,523, filed on Feb. 21, 2010, provisional application No. 61/306,524, filed on Feb. 21, 2010, provisional application No. 61/299,823, filed on Jan. 29, 2010.

(51) Int. Cl.
*G06F 17/30* (2006.01)

(52) U.S. Cl.
CPC ... *G06F 17/30684* (2013.01); *G06F 17/30731* (2013.01)

(58) Field of Classification Search
CPC ............... G06F 17/30719; G06F 17/30867; G06F 17/30958
See application file for complete search history.

(56) References Cited

U.S. PATENT DOCUMENTS

| | | | |
|---|---|---|---|
| 5,930,788 A | 7/1999 | Wical | |
| 6,101,515 A | 8/2000 | Wical | |
| 6,487,545 B1 | 11/2002 | Wical | |
| 8,060,357 B2* | 11/2011 | Segond | G06F 17/2247 704/1 |
| 8,856,096 B2* | 10/2014 | Marchisio | G06F 17/30731 707/706 |
| 2004/0153451 A1 | 8/2004 | Phillips | |
| 2006/0253438 A1 | 11/2006 | Ren | |
| 2007/0073678 A1* | 3/2007 | Scott | G06F 17/30737 |
| 2007/0143255 A1* | 6/2007 | Mathur | G06F 17/30902 |
| 2009/0089277 A1* | 4/2009 | Cheslow | 707/5 |
| 2009/0197619 A1 | 8/2009 | Colligan | |
| 2013/0031083 A1* | 1/2013 | Madhavan | G06F 17/30864 707/713 |

* cited by examiner

*Primary Examiner* — Miranda Huang

(57) ABSTRACT

Computer-implemented methods for determining term importance and for search relevance ranking, document tagging and summarization are disclosed. The methods include steps for discovering prominent and information-rich terms by performing analysis on term attributes including structural and distributional attributes and grammatical attributes which include the subject and non-subject of a sentence, and head and modifier of a phrase. Methods for tagging documents with important terms and ranking search results based on prominence measures of queried terms are also disclosed.

19 Claims, 17 Drawing Sheets

Object name: Computer

| Property Names | Object-dependent Association Strength |
|---|---|
| CPU | 0.99 |
| motherboard | 0.90 |
| memory | 0.95 |
| hard disk | 0.80 |
| operating system | 0.98 |
| speed | 0.60 |
| multi-media | 0.50 |
| case | 0.2 |
| software | 0.7 |
| color | 0.2 |
| UNIX | 0.5 |
| Microsoft | 0.8 |
| …… | …… |

Figure 1

| Term | External Term Prominence | | | |
|---|---|---|---|---|
|  | With parser | Without parser | Paragraph | Document |
| computer | 0.002 | 0.0003 | 0.05 | 0.0004 |
| CUP | 0.001 | 0.0004 | 0.002 | 0.0002 |
| memory | 0.004 | 0.0006 | 0.054 | 0.0003 |
| Hard disk | 0.006 | 0.0003 | 0.056 | 0.0004 |
| software | 0.002 | 0.0003 | 0.058 | 0.0006 |
| ...... | | | | |

Figure 4A: external data table

| Term | External Term Prominence for different grammatical roles in terms of token types | | | | | | | | | |
|---|---|---|---|---|---|---|---|---|---|---|
|  | Type 1 | Type 2 | Type 3 | Type 4 | Type 5 | Type 6 | Type 7 | Type 8 | Other 1 | Other 2 |
| computer | 0.002 | 0.0003 | 0.05 | 0.0004 | 0.03 | 0.09 | 0.001 | 0.03 | 0.21 | 0.05 |
| CUP | 0.001 | 0.0004 | 0.002 | 0.0002 | 0.03 | 0.099 | 0.001 | 0.03 | 0.14 | 0.009 |
| memory | 0.004 | 0.0006 | 0.054 | 0.0003 | 0.03 | 0.093 | 0.001 | 0.03 | 0.05 | 0.0045 |
| Hard disk | 0.006 | 0.0003 | 0.056 | 0.0004 | 0.03 | 0.095 | 0.001 | 0.03 | 0.07 | 0.222 |
| software | 0.002 | 0.0003 | 0.058 | 0.0006 | 0.03 | 0.096 | 0.001 | 0.03 | 0.08 | 0.021 |
| ...... | | | | | | | | | | |

Figure 4B: external data table with values for different token types

| From | Subject | Keywords | Date | Size |
|---|---|---|---|---|
| John | Re: Weekend Exercise | Hiking, Next Sunday, | 3/1/2009 | 8 KB |
| Mary | Weekend Exercise | Lakeside, park | 2/27/2009 | 2 KB |
| Mary | bascketball | Lakers | 2/20/2009 | 6 KB |
| Michael | Re: Class schedule | Afternoon labs | 2/3/2009 | 5 KB |
| Susan | Class schedule | physics, English | 2/3/2009 | 4 KB |
| Jason | Re: Healthy food info | Healthy food, club activity | 1/21/2009 | 4 KB |
| Jim | Re: Healthy food info | Healthy food, club activity | 1/21/2009 | 3 KB |
| Jessica | Healthy food info | Healthy food, new studies | 1/20/2009 | 3 KB |

Figure 7

| Unique Terms in a Document | Corresponding Term Frequency |
|---|---|
| | |
| computer | 15 |
| CPU | 20 |
| memory | 25 |
| hard disk | 8 |
| operating system | 16 |
| software | 6 |
| ...... | ...... |

Figure 8A

| Unique Terms in the Inverted Index of the Document Collection | Postings for Each Term in the Inverted Index with Term Frequency |
|---|---|
| | |
| computer | {doc-1:15, doc-3:12, doc-20:11, ... doc-n:2} |
| CPU | {doc-52:38, doc-3:35, doc-88:11, ... doc-m:1} |
| memory | {doc-12:55, doc-25:40, doc-2:25, ... doc-k:1} |
| hard disk | {doc-8:19, doc-5:18, doc-22:16, ... doc-j:2} |
| operating system | {doc-23:18, doc-25:17, doc-62:16, ... } |
| software | {doc-68:7, doc-56:6, doc-12:3, ... } |
| ...... | ...... |

Figure 8B

| Unique Terms in a Document | Corresponding Term Information Focus Score |
|---|---|
|  |  |
| computer | 1.0 |
| CPU | 0.6 |
| memory | 0.3 |
| hard disk | 0.5 |
| operating system | 0.4 |
| software | 0.2 |
| …… | …… |

Figure 9A

| Unique Terms in the Inverted Index of the Document Collection | Postings for Each Term in the Inverted Index with Term Information Focus Score |
|---|---|
|  |  |
| computer | {doc-98:1.0, doc-6:0.95, doc-12:0.7, … doc-n:0.16} |
| CPU | {doc-11:0.8, doc-78:0.65, doc-4:0.52, … doc-m:0.01} |
| memory | {doc-53:0.77, doc-68:0.35, doc-1:0.35, … doc-k:0.2} |
| hard disk | {doc-5:0.65, doc-7:0.35, doc-22:0.32, … doc-j:0.002} |
| operating system | {doc-68:0.46, doc-3:0.35, doc-9:0.21, … } |
| software | {doc-32:0.71, doc-32:0.7, doc-2:0.3, … } |
| …… | …… |

Figure 9B

| From | Subject | Date | Size |
|---|---|---|---|
| John | Re: Healthy food info | 3/1/2009 | 8 KB |
| Mary | Weekend Exercise | 2/27/2009 | 2 KB |
| Mary | Re: Healthy food info | 2/20/2009 | 6 KB |
| Michael | Re: Healthy food info | 2/3/2009 | 5 KB |
| Susan | Re: Healthy food info | 2/3/2009 | 4 KB |
| Jason | Re: Healthy food info | 1/21/2009 | 4 KB |
| Jim | Re: Healthy food info | 1/21/2009 | 3 KB |
| Jessica | Healthy food info | 1/20/2009 | 3 KB |

Figure 15A

| From | Subject | New Topics 1510 | Date | Size |
|---|---|---|---|---|
| John | Re: Healthy food info | Hiking, Next Sunday, | 3/1/2009 | 8 KB |
| Mary | Weekend Exercise | Lakeside, park, sunny | 2/27/2009 | 2 KB |
| Mary | Re: Healthy food info | Water filter, price, mall | 2/20/2009 | 6 KB |
| Michael | Re: Healthy food info | Apple skin, pesticide | 2/3/2009 | 5 KB |
| Susan | Re: Healthy food info | Plastic wrapping, pollutants | 2/3/2009 | 4 KB |
| Jason | Re: Healthy food info | Healthy food, club activity | 1/21/2009 | 4 KB |
| Jim | Re: Healthy food info | Healthy food, club activity | 1/21/2009 | 3 KB |
| Jessica | Healthy food info | Healthy food, new studies | 1/20/2009 | 3 KB |

Figure 15B

SYSTEM AND METHODS FOR DETERMINING TERM IMPORTANCE, SEARCH RELEVANCE, AND CONTENT SUMMARIZATION

CROSS REFERENCES TO RELATED APPLICATIONS

The present application is a continuation application of and claims priority to U.S. patent application Ser. No. 13/769,396 entitled "Systems, Methods, and User Interface for Discovering and Presenting Important Contents in a Document". U.S. patent application Ser. No. 13/769,396 is a continuation application of U.S. patent application Ser. No. 12/972,462 entitled "Automated Topic Discovery in Documents" filed by the present inventor on Dec. 18, 2010, which is now U.S. Pat. No. 8,407,217. U.S. patent application Ser. No. 12/972,462 further claims priority to U.S. Provisional Patent Application 61/299,823, titled "System and methods for automated document topic discovery, browsable search, relevance ranking, summary generation and display", filed by the present inventor on Jan. 29, 2010, U.S. Provisional Patent Application 61/306,523, titled "System and methods for efficient email indexing, search, and storage", filed by the present inventor on Feb. 21, 2010, and U.S. Provisional Patent Application 61/306,524, titled "System, methods, and user interface for extracting and displaying symbolic elements from user-created contents", filed by the present inventor on Feb. 21, 2010, the contents of which are incorporated herein by reference.

BACKGROUND

The present application relates to information management technologies, and more particularly, to technologies for automated topic discovery in documents, content highlighting, document search and ranking.

Information overload is a common problem in the information age. Accurate and efficient information access, including collection, storage, organization, search and retrieval is the key to success in this information age.

Much of the information is contained in natural language contents, such as text documents. One particular challenge in information management is to efficiently handle what is called the "unstructured data". Usually, a document collection in its natural state is unorganized, or in a so-called unstructured state. Examples of such documents can include Web pages scattered over the Internet, documents in a company or other organizations, and documents on personal computers.

Various theoretical and practical attempts have been made to organize and determine the amount and relevancy of the information in natural language contents. Conventional techniques include search engines and document classification systems. In document search, information in the unstructured document data is accessed by sending queries to a search engine or index server that returns the documents believed to be relevant to the query. One problem with using queries to access unknown data is that the users often do not know what information is contained in the documents. Thus users often cannot come up with the right key words to effectively retrieve the most relevant information. Another problem is that conventional search engines cannot accurately determine the amount of information or the focus of information contained in a document, such that the results produced by conventional search engines usually contain many irrelevant data. Often, time is wasted before the needed information is found.

There is still a need for technologies that can provide more efficient ways for finding the needed information among a large number of documents, and provide alternative ways to conventional search in finding such information.

SUMMARY

The presently disclosed systems and methods are intended to overcome the above described drawbacks and meet the challenges in the conventional information management techniques.

The present disclosure provides an efficient, reliable, and scalable solution to organizing and transforming unstructured data into forms that can help the user to easily and quickly find the needed documents.

The present disclosure provides novel methods for the automatic identification or discovery of the potential topics in a document, or a portion of a document, or a collection of multiple documents. Moreover, the terms in such document objects can be ranked according to their respective degrees of prominence in terms of representing the information focus of the document.

The present disclosure further provides methods for the application of such information focus data as solutions to organizing the unstructured data, in terms of facilitating more accurate and faster search and retrieval of needed documents.

In a general aspect, the present invention relates to a computer-assisted method for discovering topics in a document. The method includes obtaining a first group of text units in a first document by a computer system, each of the text units in the first group comprises one or more words; tokenizing the first group of text units by the computer system to produce a plurality of tokens that include a jth token; assigning token types to the tokens in the first group of text units according to the grammatical roles of the tokens; assigning weighting coefficients to the tokens in the first group of text units according to the token types of the tokens; for each text unit in the first group that includes the jth token, adding a weighting coefficient to a parameter token_j_count; dividing a cumulative value of the parameter token_j_count obtained from the first group of text units by the total number of text units in the first group to produce an internal term prominence (ITP) value for the jth token; calculating a term prominence value for the jth token using at least the ITP value of the jth token; selecting one or more tokens from the plurality of tokens at least in part based on the term prominence values of the respective tokens; and outputting, by the computer system, one or more topic terms comprising the selected one or more tokens to represent the topics in the first document.

Implementations of the system may include one or more of the following. Each of the text units is a sentence or a paragraph. The first group of text units can be obtained from a portion of the first document. The one or more tokens are selected from the plurality of tokens if their respective term prominence values are above a predetermined threshold. The value of the weighting coefficient can be dependent on the grammatical role of the jth token. The computer-assisted method can further include obtaining a data set comprising a plurality of external term prominence (ETP) values each associated with one of the plurality of tokens including the jth token, wherein the ETP value is calculated using external documents different from the first document, wherein the term prominence value for the jth token is calculated using the ITP and the ETP values of the jth token. The data set can be obtained by the following steps: tokenizing a second group of text units in the external documents to produce a plurality of tokens comprising the jth token; for each text unit in the second group of text units that includes the jth token, adding a weighting coefficient to a parameter token_j_count, wherein the value of the weighting coefficient is dependent on the grammatical role of the jth token; and calculating an external term prominence value (ETP) for the jth token by dividing a cumulative value of the parameter token_j_count obtained from the second group of text units by the total number of text units in the second group of text units. The values of the weighting coefficients can be constant for different tokens. The term prominence value can be equal to the ITP value subtracted by the ETP value. The term prominence value can be the square of ITP value divided by the sum of the ITP value and the ETP value. The external documents can be randomly selected. The text unit can include a sentence, wherein the token types comprises one or more of a first token type defining a token that matches the subject of the sentence, a second token type defining a token that is the head of a multi-word phrase in the subject of the sentence, a third token type that is a modifier in a multi-word phrase in the subject of the sentence, or a fourth token type defining a token that matches the predicate of the sentence. The token types can include one or more of a fifth token type defining a token that is the head of a sub-phrase in the predicate of the sentence, a sixth token type defining a token that is a modifier in a sub-phrase in the predicate of the sentence, or a seventh token type defining a token that is in any other text in the sentence.

In another aspect, the present invention relates to a computer-assisted method for ranking documents based on the topics contained in the documents. The method includes obtaining a first group of text units in one of the documents in a document collection by a computer system, each of the text units comprises one or more words; tokenizing the first group of text units by the computer system to produce a plurality of tokens that include a jth token; assigning token types to the tokens in the first group of text units according to the grammatical roles of the tokens; assigning weighting coefficients to the tokens in the first group of text units according to the token types of the tokens; for each text unit in the first group that includes the jth token, adding a weighting coefficient to a parameter token_j_count; dividing a cumulative value of the parameter token_j_count obtained from the first group of text units by the total number of text units in the first group to produce an internal term prominence (ITP) value for the jth token; obtaining a data set comprising a plurality of external term prominence (ETP) values each associated with one of the plurality of tokens including the jth token, wherein the ETP value is calculated using a second group of text units from external documents outside of the document collection; calculating a term prominence value for the jth token using the ITP and the ETP values of the jth token; receiving a query comprising a keyword against a collection of documents containing text; matching the keyword to one of the plurality of tokens to obtain a matched token; and ranking, by the computer system, the documents by the term prominence values for the matched token associated with their respective documents.

Implementations of the system may include one or more of the following. The computer-assisted method can further include outputting, by the computer system, one or more documents that have the highest term prominence values for the matched token in the collection of documents. The first group of text units can be obtained from a portion of the one of the documents in the collection.

In still another aspect, the present invention relates to a computer-assisted method for searching the most-recently added text in emails. The method includes receiving a plurality of email messages each comprising multiple text segments and a plurality of terms for analyzing the plurality of email messages; identifying, by the computer system, a recent text segment in each of the plurality of email messages, wherein the recent text segment in a email message comprises the recent text in the email message; computing an importance score for each of the plurality of terms in the recent text segments in the plurality of email messages; receiving a query comprising a keyword; matching the keyword to one of the plurality of terms to obtain a matched term; ranking the recent text segments in the plurality of email messages by their respective importance scores of the matched term; and outputting one or more email messages that have the highest term importance scores for the matched term in the respective recent text segments.

Although the invention has been particularly shown and described with reference to multiple embodiments, it will be understood by persons skilled in the relevant art that various changes in form and details can be made therein without departing from the spirit and scope of the invention.

BRIEF DESCRIPTION OF THE DRAWINGS

The following drawings, which are incorporated in and form a part of the specification, illustrate embodiments of the present invention and, together with the description, serve to explain the principles of the invention.

FIG. 1 illustrates an example of the Object-Properties Association definition of the object "computer" in accordance with the present invention.

FIGS. 4A and 4B are exemplar data structures comprising terms and their associated prominence values for different token types as external data.

FIG. 7 is an exemplar user interface displaying topic terms to describe pertinent topic information in individual emails.

FIGS. 8A and 8B show conventional frequency-based document indexing and search result ranking.

FIGS. 9A and 9B show exemplified approaches for information-focus-based document indexing and search result ranking in accordance with the present invention.

FIGS. 15A and 15B show emails listed with the most-recent topics discovered and displayed in accordance with the present invention.

DETAILED DESCRIPTION

Figure 2:
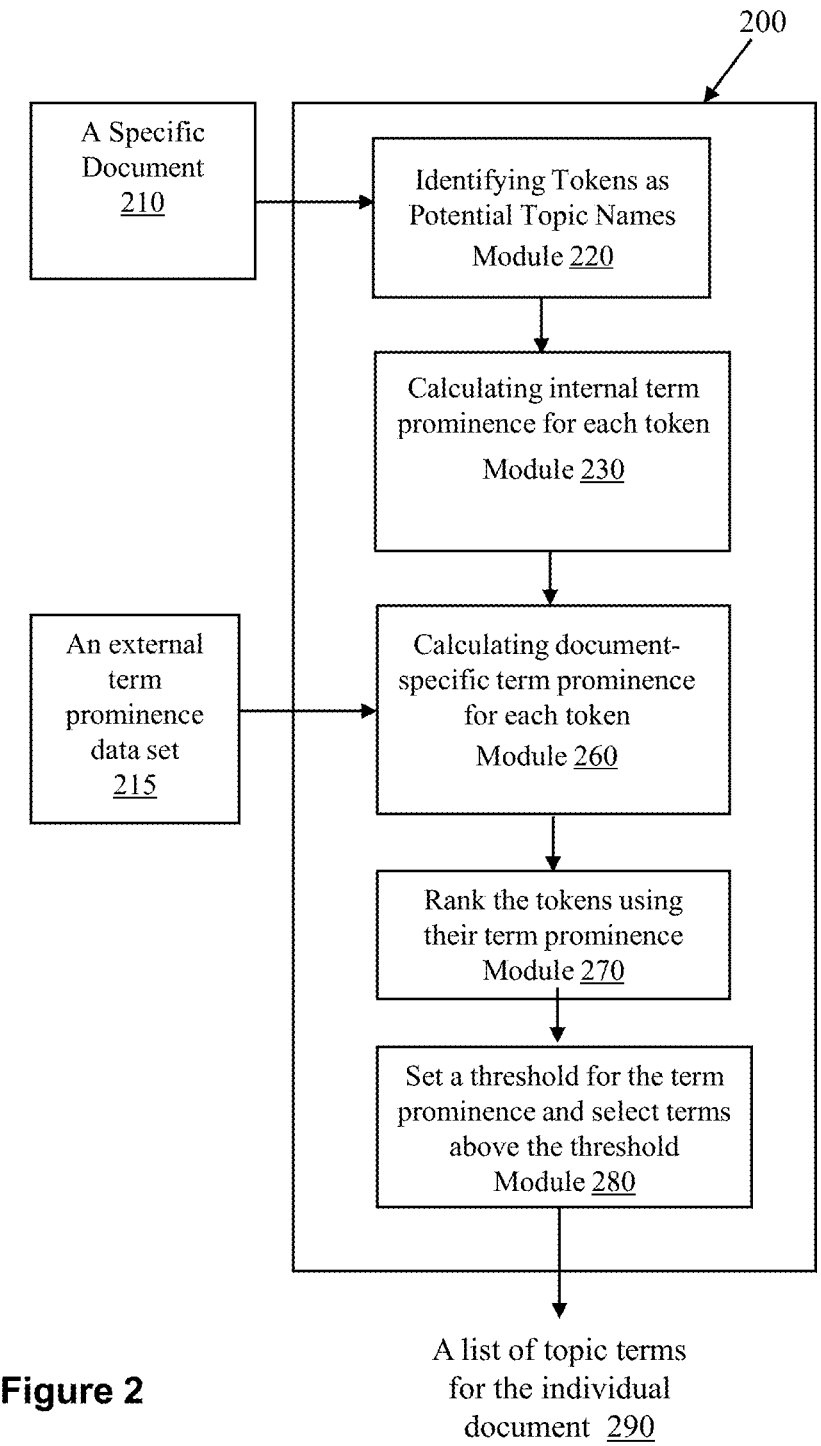
FIG. 2 is an exemplar system diagram for discovering potential topics in a specific document in accordance with the present invention.

The present disclosure is based on a theoretical framework developed by the present inventor about aspects of human knowledge and linguistic information.

Human knowledge, or aspects of human knowledge, can be represented in various ways. While internal knowledge representations are functions of human brains, external or artificial representations such as Frame Representation and Semantic Networks are simulation models for certain aspects of such internal knowledge.

The present invention is based on a novel model developed by the present inventor for knowledge and linguistic information representation. The model, called Object Properties Association Model (OPAM), states that part of human knowledge is based on concepts about objects and their associated properties, or based on relationships between different objects. Certain objects are perceived as the properties of other objects. Certain objects are associated with other objects in ways that uniquely define the concepts of such other objects. Simply put, OPAM contends that an object can be uniquely defined by all its associated properties each of which carries a varying amount of information about the object.

As an example, an object named "computer" is defined by the Merriam-Webster online dictionary as "one that computes; specifically: a programmable usually electronic device that can store, retrieve, and process data". However, the OPAM model of the present disclosure has a different approach to represent our knowledge about the object of "computer". Referring to FIG. 1, in the OPAM model, the object named "computer" is characterized by a plurality of associated properties such as "CPU", "motherboard", "memory", "hard disk", "operating system", "speed", "case", "software", etc., that are associated with the object "computer". The prominence of the association between "computer" and each of the properties is characterized by a numerical value herein called association strength. Hypothetical values for the association strengths for "CPU", "motherboard", "memory", "hard disk", "operating system", can for example respectively be 0.99, 0.90, 0.95, 0.80, and 0.98. A higher association strength value can represent a stronger association between the property and the object. The object "computer" can be uniquely defined by the associated properties and their respective association-strength values. Moreover, the association-strength value for a property is specific to the object, and usually varies for different objects. For example, the property "color" may have an association-strength value of 0.8 if the object is "flower", but an association-strength value of 0.2 if the object is "computer".

Conventional knowledge representation models such as the Frame Representation and Semantic Networks focus on the types of relationships between different objects and their derived relationships, such as a tree-like structure of parent-children relationships among different objects. OPAM model of the present invention, in contrast, focuses on what properties are associated with a particular object and their association strength or defining power to the object. OPAM is not focused on the exact types of relationships between the properties and the object.

In OPAM, the object can be a physical object, or an abstract object such as a concept, and can be represented by a symbolic name in a language such as a word, a list of words or a phrase, a character string, a query, a subcomponent of a query, a topic, or the name of a document category.

It should be noted that as the present disclosure involves natural languages, and makes references to certain grammatical terms such as a "sentence", and the "subject" and "predicate" of a sentence, the term "object" used in the present disclosure is different from the grammatical term of "object" that refers to the object of a transitive verb, such as a noun or a pronoun, which may be in the accusative case in certain languages. In the present disclosure, this sense of "object" is not used. The sense of "object" used in the present disclosure is a thing or a concept with a name.

Properties of an object can have varying degrees of prominence or association strengths to the object. While the properties are "defining features" of an object, the association strengths in OPAM specify that some properties are more "defining" than others. For example, the object of "computer" is associated with various properties such as having a CPU, memory, a case, a hard disk, as shown in FIG. 1. The property "CPU" having an association-strength of 0.99 is a more defining feature of the object "computer" than the property "case" that has an association-strength value of 0.2.

The OPAM also states that such object-properties relationships are contained in our everyday language. Corresponding to the grammatical structure, there is an information structure in the language we use. Take a simple declarative sentence for example. A simple declarative sentence consists of two parts, the subject and the predicate. In linguistics, a common understanding is that the subject is what the sentence is about, and the predicate tells something about the subject. In the following simple sentences:

1A: "John is a student."
1B" "John is intelligent."

"John" is the subject of the sentences, while "is a student" and "is intelligent" are respectively the predicates of sentences 1A and 1B.

In the OPAM model, the predicate is interpreted as providing a piece of measurable information about the subject of the sentence. The OPAM model also states that human languages convey information in the basic form of stating that an object has certain properties, or an object is associated with certain other objects as being its properties. The general information structure for a simple declarative sentence is "Object O has or is associated with Property P", or O+P, corresponding to the grammatical structure of "Subject+Predicate", where the Subject is the name of an object, and the Predicate is a declaration that the object has (or is associated with) one or more properties. In the present disclosure, the use of "simple sentence" and "simple declarative sentence" is interchangeable.

The simple sentence 1A is a statement about two objects of "John" and "student". In a conventional understanding, the speaker is telling something about John (that he is a student). In a mathematical or logical interpretation, the object "John" is declared to be a member of the object class of students. In the presently disclosed OPAM, the object "John" is said to m have or to be associated with a property of "being a student". The speaker is providing a piece of information about the object of "John". The simple sentence 1B associates another property with the object of "John" (that he is intelligent), thus providing another piece of information about the object of "John".

The same information structure in the simple sentences can also hold in complex sentences, as well as the grammatically distinguished compound sentences. A complex sentence is a sentence that contains other (embedded) sentences or clauses as its components. For example, in the complex sentence "I know that you are intelligent", the predicate "know that you are intelligent" contains another sentence of "you are intelligent", which has its own subject ("you" in this case) and predicate ("are intelligent"). Complex sentences, and simple sentences contained in them, can be recursively reduced to the atomic Subject+Predicate structure, corresponding to the basic information structure of Object+Property.

In conventional grammar, a compound sentence is a sentence that contains two or more independent clauses, or non-embedded clauses, such as "John is a student, and Mary is a teacher." in which the two clauses do not contain each other. For convenience, in the present disclosure, the term "complex sentence" refers to both the complex sentence and the compound sentence.

The subject or the predicate of a sentence can be in the form of a single word, a string of words or a phrase, or an embedded clause.

In linguistics, a phrase that consists of multiple words is often called a complex phrase, with an internal structure of "Modifiers+Head". For example, in the phrase "digital cameras", "digital" is the modifier, while "cameras" is the head. The order of the head vs. the modifiers in the phrase depends on the specific languages. In English, the head of a noun phrase may either be before or after the modifier. For example, in the phrase "the observed facts" and "the facts observed", the head noun of "facts" can be before or after the modifier. Under the OPAM model of the present invention, the informational structure of a complex phrase can also be represented by Object+Property, corresponding to the grammatical structure of the Head+Modifier. For example, in the phrase "digital camera", "digital" is interpreted as a property of the object of camera.

A document can include one or more paragraphs. Each paragraph can include one or more simple and/or complex sentences.

Details about other aspects of the Object-Properties Association Model is disclosed in commonly assigned U.S. patent application Ser. No. 12/573,134, titled "System and Methods for Quantitative Assessment of Information in Natural Language Contents", filed on Oct. 4, 2009, and Provisional Patent Application 61/143,140, titled "System and Methods for Quantitative Assessment of Information in Natural Language Contents" filed on Jan. 7, 2009, both by the present inventor.

In the above referenced disclosure, the focus is on the calculation of the information quantity of a specific text unit for a specific object. In the present disclosure, the focus is on identifying the general information focus of a document, a sub-segment of a document, or a document collection comprising a plurality of documents.

In the present disclosure, the OPAM model further states that the symbolic names of objects and properties, such as a word, a multiword phrase, or any sequence of words or phrases, referred to hereafter as a term or terms, also represent the information focus (of deferent degrees) of the linguistic units that contain them, such as a sentence, a paragraph, or a document, and thus can be treated as potential topics or subjects of interest of such linguistic units.

In the present disclosure, the OPAM model further states that while property names (or property terms) provide varying amounts of information about the object, the object names are of a higher degree of information focus in the sentence than property names. Thus, it is interpreted that the subject of a sentence in a document usually receives more information focus than other constituents of the sentence; and the head of a complex phrase usually receives more information focus than a modifier in the phrase. In OPAM model, this is the principle of degree of information focus based on the grammatical role of a term.

The model further states that for a given document, or a sub-segment of a document, or a document collection, the strength or the degree of the information focus represented by a particular term is further determined by the prominence of the term inside the document, or its sub-segments, or the document collection, herein called "the internal term prominence" (ITP), together with the prominence of the term outside the document or document collection, herein called "the external term prominence" (ETP).

In quantitatively assessing the strength of information focus of a term, the present disclosure first uses a weighting coefficient method to distinguish the degree of information focus on terms that play different roles in the linguistic structure.

And then, the present disclosure provides methods for the calculations of the values of both the internal term prominence (ITP), and the external term prominence (ETP), and methods for calculating the document-specific term prominence (DSTP) as a measure of the strength of a term's information focus in the document.

FIG. 2 is an exemplified system diagram for discovering the potential topics of a specific document. A system 200 includes a plurality of functional modules. First, a specific document 210 is stored in the storage media in a computer system, and accessed by the system 200. Each term in the documents is extracted as a potential topic term by module 220.

The Internal Term Prominence value for each token is calculated by module 230. On the other hand, an external term prominence data set 215 is also stored in the storage media in a computer system, and accessed by the system 200.

The data set 215 includes a plurality of terms; each is associated with a plurality of values representing the context-dependent prominence scores of the term in a large randomly selected document collection. FIGS. 4A and 4B show examples of such a data table showing hypothetical term names and associated values of their external prominence score.

For a specific document, the Document-Specific Term Prominence (DSTP) value for each token is calculated by module 260, using the values from module 230 and data table 215. Then, all the tokens are sorted in descending order by their DSTP values module 270, and a threshold value is determined in module 280 to select those that have their DSTP value above the set threshold, and the selected tokens are output by the system as a list of topic terms (290) of the specific document.

The present disclosure provides methods for first calculating the external term prominence data, with a special data structure to represent such data, and methods for storing the data for later use and reuse.

Figure 3:
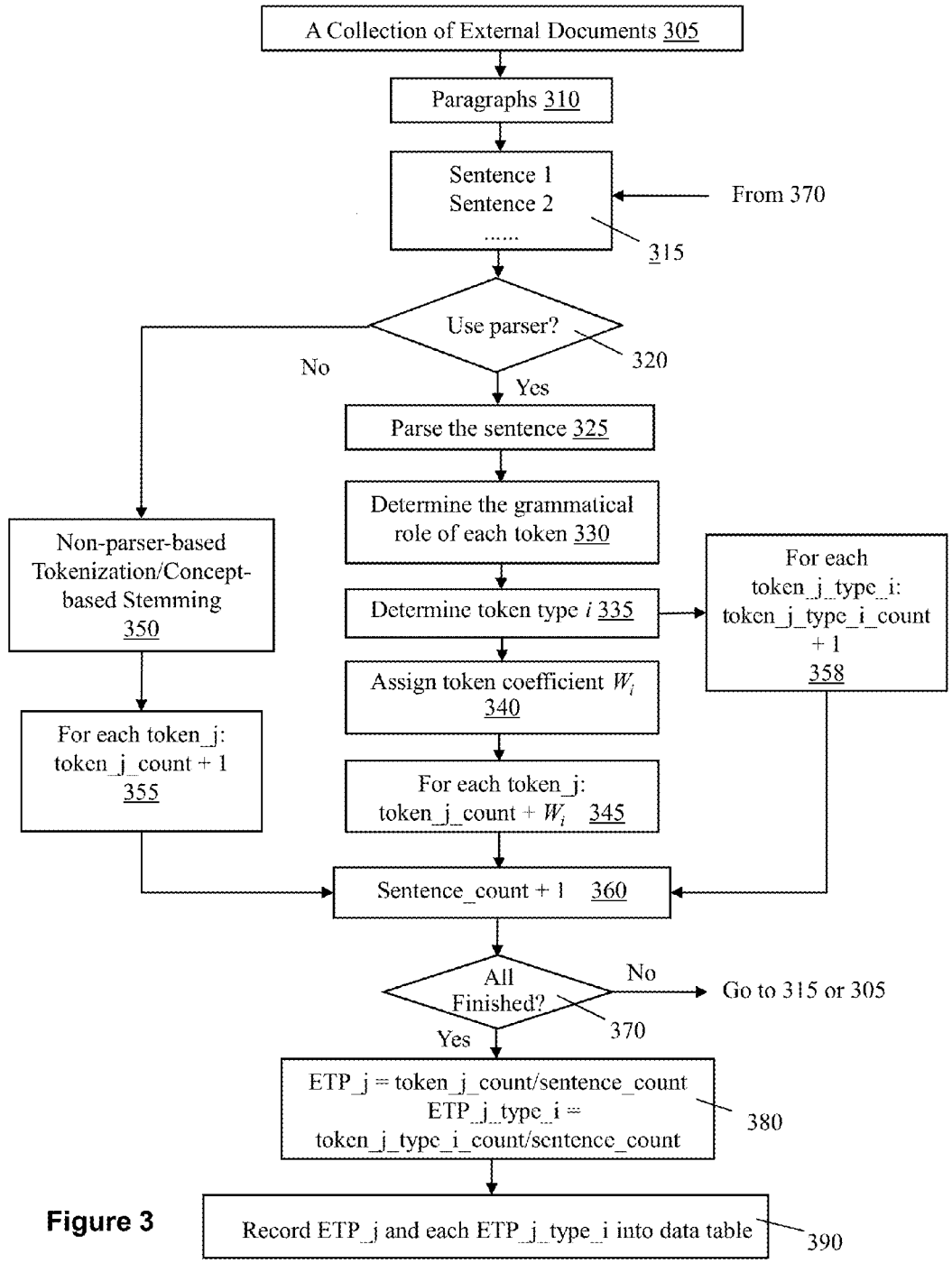
FIG. 3 is an exemplar flow diagram for automatically and quantitatively identifying external term prominence values from a non-specific collection of documents.

FIG. 3 illustrates detailed steps for calculating the external term prominence ETP score for a plurality of terms from a large randomly selected document collection. For each document in the collection (step 305), the document is broken into smaller units of paragraphs and sentences (Steps 310, 315).

Next, a decision is made whether a syntactic parser is to be used or not (320). The use of a syntactic parser is preferred, but not required.

A syntactic parser is in most cases a rule-based procedure, mostly embodied in the form of a computer program. It receives a string of characters, such as a sentence or an equivalent, and outputs a structural description of the grammatical relations between various components of the sentence. Syntactic parsers of various types can be freely or commercially available, or can be constructed based on rules one wishes to employ. The syntactic parser can be used to divide a complex sentence into simple sentences, and then divide a simple sentence into a subject and a predicate. It can further divide a multi-word complex phrase into its components such as a head and its modifiers. As it is known, a syntactic parser may not always produce a structural description of a sentence that conforms to the understanding by human language users.

Depending on whether a syntactic parser is used or not, for each sentence, words and/or phrases in the sentence are extracted as tokens or potential topic names using corresponding methods (steps 325, 350).

Depending on the specific language being processed, a process called stemming may be employed. This usually applies to Western languages, such as English and other members of the Indo-European language family, but not always applicable in many of the Eastern languages. When it applies, as an optional step, the presently disclosed methods provide a novel approach of concept-based stemming in the tokenization of the sentences in the raw data. The concept-based stemming merges only those words that are morphological variations of the names of the same concept or object name, for example, the plural form of a noun with the singular form of the same noun in English. In English, certain morphological variations of verbs, such as those for tense and aspects (e.g. "go", "went", and "gone") have their own shades of meaning and thus are not recommended for stemming. Variations for subject-verb agreement, such as "go" vs. "goes", are recommended for merging since they are referring to the same concept of an action. One aspect of the presently disclosed methods is that different rules of morphological consolidation can be used for specific languages. This concept-based stemming method is different from common practices in the conventional document retrieval or classification.

In some aspects, the so-called "stop words" can be included in the presently disclosed methods. Some words that are treated as "stop words" in conventional techniques are considered here to be also meaning-carrying units in the language, which may be part of the names of potential properties of certain objects. For example, "the" and "a" in English are conventionally excluded from text analysis as non-meaning-carrying words. However, phrases such as "a house" and "the house" can be very different in meaning under different contexts. In a legal document about the ownership of a house, a sentence "He owns a house" can have a very different consequence from the sentence "He owns the house". Since the present system and methods involve the meanings of natural languages, such conventional "stop word" can be included.

If a parser is used, as in step 325, each sentence is parsed by the parser to identify the grammatical components of the sentence such as the subject, the predicate and detailed structures within the subject and the predicate, or other parts of the sentence (step 330). For a multiword complex phrase, the parsing operation can identify the head and the modifier of the phrase.

Each token in the sentence is assigned a token type according to its grammatical role in the sentence as determined by the syntactic parser (step 335). An exemplified Token Type definition can include the following:

If the token matches the subject, the token is marked as a Type 1 token.

If the subject is or contains a multi-word phrase and the token is the head of the multiword phrase, the token is marked as a Type 2 token.

If the subject is or contains a multi-word phrase and the token is a modifier in the multiword phrase, the token is marked as a Type 3 sentence.

If the token matches the predicate of the sentence, the token is marked as a Type 4 sentence.

If the predicate is or contains a sub-phrase and the token is the head of the sub-phrase, the token is marked as a Type 5 sentence.

If the predicate is or contains a multiword phrase and the token is a modifier in the multiword phrase, the token is assigned as Type 6.

If the token is in any other text in the sentence, the token is marked as a Type 7 sentence.

As described above in relation to OPAM, different types of tokens may represent different degrees of information focus as a result of their being in different grammatical roles in the sentence.

Each type of token i is then assigned a weighting coefficient value (step 340). The weighting coefficient, $W_i$, can have an exemplar value between 0 and 1, the magnitude of which reflects the different degrees of likelihood that such a token may be an information focus in the sentence. Using the example of the Token Type definition described above, $W_1$ (for a Type 1 token) may be assigned a value of 1 because a term as the subject of a sentence is more likely to represent the information focus of the sentence than other types of tokens in the sentence. Thus, if the j-th token is a Type 1 token then the parameter "token_j_count" is incremented by 1 (345). Similarly, values of other weighting coefficients can be exemplarily set as $W_2=0.9$; $W_3=0.8$; $W_4=0.7$; $W_5=0.6$; $W_6=0.5$; $W_7=0.4$ for the corresponding types of tokens in accordance with the decreased likelihood that a token may represent the information focus of the sentence. In general, instead of simply counting one for each occurrence of the jth token, the contributions to "token_j_count" are the token's respective weighting coefficients that are associated with the specific type the token is in. This is mathematically equivalent to each token count being scaled by the respective weighting coefficients according to the type the token is in.

For the purpose of recording into the data structure the raw external term prominence values that are not weighted or scaled by the weighting coefficient associated with the corresponding token type, a plurality of token counters are set up for each token type i that the jth token may possibly be in. Step 358 records the count of each token type the jth token occurs in as token_j_type_i_count. So if there are a total of N token types such as defined previously, there will be N token type counters for a token for this purpose. Steps 340 and 345 are skipped so no weighting coefficient is applied. In the present disclosure, the purpose of producing this data structure with raw values is to provide flexibility for customization in using different weighting coefficient values and ranges for each token type when such data are used in calculating the topic strength values of the corresponding terms in specific documents or document collections.

If a parser is not used (step 350), as a follow up to a negative answer to the question in the step 320, the sentence bypasses the parsing and the token type and weighting coefficient assignment process from step 325 to step 345.

When this is the case, first, for the tokenization of the sentence, other methods such as single-word tokens or multi-word n-gram methods can be used (step 350).

Then, for each token in the sentence, the parameter "token_j_count" is simply incremented by 1 if the j-th token occurs in the sentence at least once (step 355). Optionally, this case of not using a parser can be treated as a special case of using the parser where the parser does not label the token with any grammatical role, and a special token type, such as type 8, can be assigned to the token to indicate that no grammatical roles are distinguished, so that all occurrences of the tokens are treated the same, or the weighting coefficient of type 8 token can be assigned the value of 1.

After all tokens in the sentence are counted, the parameter "sentence count" is next incremented by 1 (step 360). The parameter "sentence count" tracks the total number of sentences that passes the step 320, each of which may include potential topic terms as the information focus associated with the document. Steps 310 to 360 are repeated until all the sentences in the paragraphs and the documents are finished.

Step 370 checks if all the sentences are finished. If the sentences in the paragraphs of the document are not finished, the steps from 315 to 360 are repeated until all sentences in the document are finished. If there are additional documents in the collection, steps 305 to 360 are repeated until all the sentences in all the documents are finished.

The external term prominence for the j-th token is the cumulative "token_j_count" divided by "sentence count", the total number of the sentences in the document collection (step 380). External term prominence for the j-th token ETP_j has a value between zero and one. The un-weighted raw external term prominence for each token type i of the j-th token ETP_j_type_i is the cumulative "token_j_type_i_count" divided by "sentence count" (380). ETP_j_type_i also has a value between zero and one using the exemplified counting method above.

In step 390, the ETP_j and ETP_j_type_i are written into their respective fields for the j-th token in a data table.

It should be noted that Token Type definition as described in the above example can include different variations, and the weighting coefficient W can be assigned different values.

In some embodiments, the number of sentences selected in the random document collection can be a portion of the documents in step 315. The "sentence count" can be adjusted accordingly.

In some embodiments, the text unit for counting tokens and computing ETP, and ETP_type_i can be paragraphs or documents instead of sentences. Paragraphs as text units can be viewed as a special case of treating the whole documents as text units when a document contains only one paragraph.

For example, when paragraphs are used as the text unit for calculating the term prominence, one exemplar method is that if a jth token occurs in a paragraph multiple times and in different token types, the parameter "token_j_count" is incremented only once for each paragraph it occurs in, either by the highest weight coefficient value Wi_max if a parser is used, or by the value of one if no parser is used, no matter how many times the token occurs in that paragraph, and no matter what other token types it may be in. The external term prominence for the jth token is calculated by dividing the cumulative "token_j_count" by the cumulative "paragraph_count".

The same methods are applicable when the text units used are whole documents instead of paragraphs.

The present disclosure includes a unique data structure for a pre-constructed data set 215 for use with discovering the document specific term prominence. FIGS. 4A and 4B illustrate exemplified data structures with data values produced by the method shown in FIG. 3. In this data structure, a term is associated with a plurality of fields each of which stores a numerical value that represents the external term prominence of this term in various contexts. FIG. 4A shows term values when a parser is used and not used, and when paragraphs and documents are used as the counting text units.

FIG. 4B shows the data table with raw external term prominence data for each token type as cited in steps 358, 380. The values in each field are calculated without applying m the weighting coefficient corresponding to the token type, so that customization can be performed later with different weight assignment scheme if needed. Take the term "computer" for example. The data structure presents the external term prominence values of this term in a random collection for its respective roles as the subject (Type 1), the predicate (Type 2), the head of a multiword phrase in the subject (Type 3), the modifier of a multiword phrase in the subject (Type 4), the head of a multiword phrase in the predicate phrase (Type 5), the modifier of a multiword phrase in the predicate phrase (Type 6), and its other roles in a sentence (Type 7). The data structure also includes a field that stores the prominence value of the term when no such grammatical roles are distinguished (Type 8). This is also the case when no parser is used. For situations where lower precision can be tolerated, analysis without a parser can reduce cost.

It should be noted that the data structure can also include fields for data obtained from other methods based on the principles of the present disclosure but are not exhaustively listed above.

As is shown in FIG. 2, the system 200 uses such an external term prominence data set 215 produced by the above methods to calculate the topic prominence of terms in specific documents.

As has been described earlier in relation to OPAM, and shown in FIG. 2, a principle in the present disclosure is that the prominence of a term as the information focus in a document is determined by two aspects of the term:

1) the prominence of the term inside the document, called "the internal term prominence"; and 2) the prominence of the term outside the document, called "the external term prominence".

Basically, the corresponding steps in producing the external term prominence data above can be repeated for the calculation of document internal term prominence.

Figure 5:
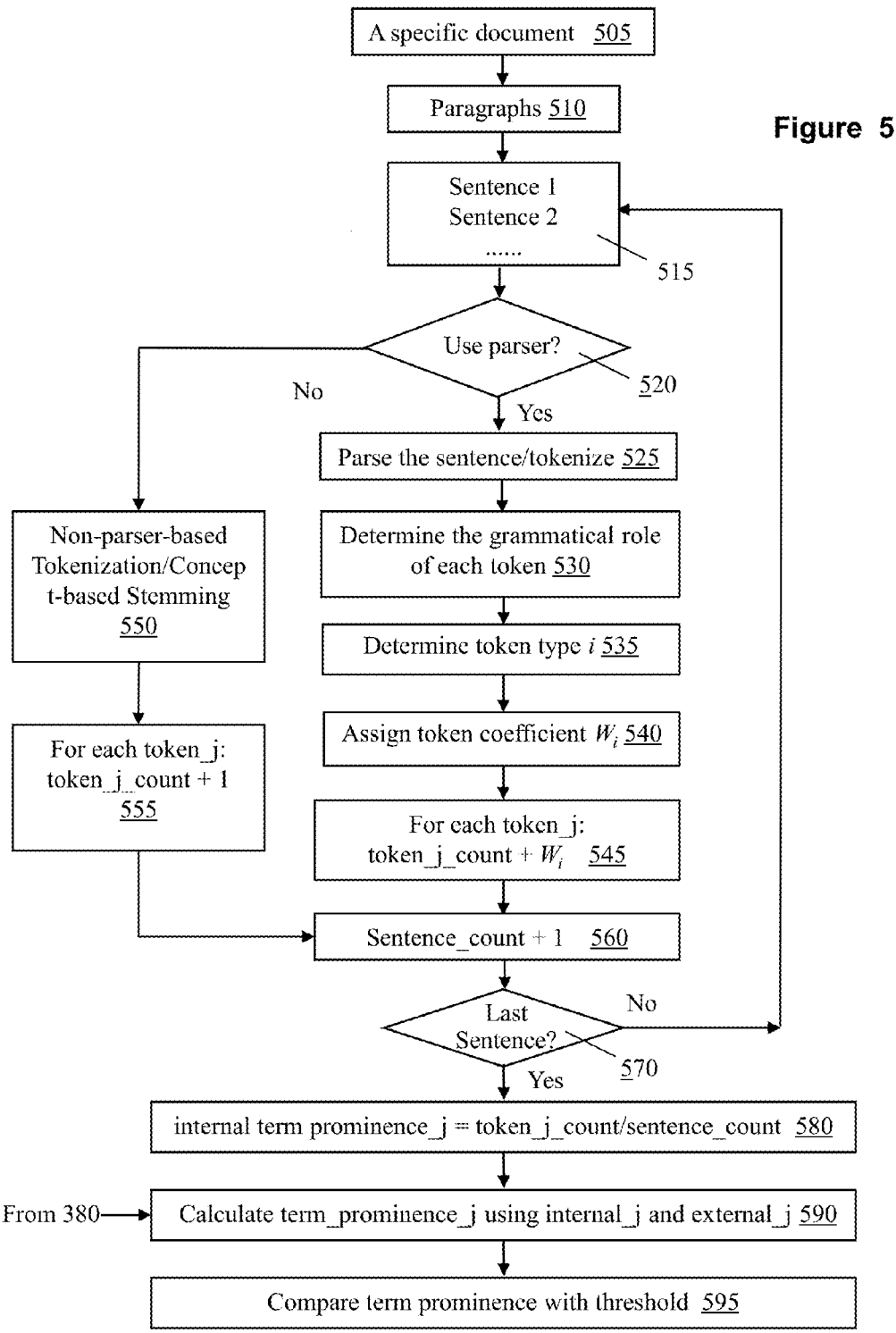
FIG. 5 is an exemplar flow diagram for automatically and quantitatively identifying topics in a document.

FIG. 5 illustrates detailed steps for calculating the internal term prominence ITP score for each term in the document.

For a document in (step 505), the document is broken into smaller units of paragraphs and sentences (Steps 510, 515).

Next, a decision is made whether a syntactic parser is to be used or not (step 520). The use of a syntactic parser is preferred, but not required. However, if the data in the external term prominence data set in FIG. 4A and FIG. 4B are produced with a syntactic parser, the parser should also be used for the production of the internal term prominence to avoid inconsistency.

Depending on whether a syntactic parser is used or not, for each sentence, words and/or phrases in the sentence are extracted as tokens or potential topic names using the corresponding methods (steps 525, 550).

As described above when producing the external data set in (step 525) and (step 550), depending on the specific language being processed, a process called stemming may be employed, and a decision is made whether to included the so-called "stop words" or not. The decision and the stemming process should be the same as those for producing the external term prominence data set to avoid inconsistency.

If a parser is used, as in step 525, each sentence is parsed by the parser to identify the grammatical components of the sentence such as the subject, the predicate and detailed structures within the subject and the predicate, or other parts of the sentence (step 530). For a multiword complex phrase, the parsing operation can identify the head and the modifier of the phrase.

Similar to the steps in FIG. 3 for external term prominence data production, if a parser is used, each token in the sentence is assigned a token type according to its grammatical role in the sentence as determined by the syntactic parser (step 535). The same Token Type definition used for the external term prominence data production as exemplified above should also be used for the internal term prominence data production. The example is repeated below for convenience:

If the token matches the subject, the token is marked as a Type 1 token.

If the subject is or contains a multi-word phrase and the token is the head of the multiword phrase, the token is marked as a Type 2 token.

If the subject is or contains a multi-word phrase and the token is a modifier in the multiword phrase, the token is marked as a Type 3 sentence.

If the token matches the predicate of the sentence, the token is marked as a Type 4 sentence.

If the predicate is or contains a sub-phrase and the token is the head of the sub-phrase, the token is marked as a Type 5 sentence.

If the predicate is or contains a multiword phrase and the token is a modifier in the multiword phrase, the token is assigned as Type 6.

If the token is in any other text in the sentence, the token is marked as a Type 7 sentence.

As described above in relation to OPAM, different types of tokens may represent different degrees of the information focus as a result of their being in different grammatical roles in the sentence.

Each type of token i is then assigned a weighting coefficient value (step 540). The weighting coefficient, $W_i$, can have an exemplar value between 0 and 1, the magnitude of which reflects the different degrees of likelihood that such a token may be an information focus in the sentence. Using the example of the Token Type definition described above, $W_1$ (for a Type 1 token) may be assigned a value of 1 because a term as the subject of a sentence is more likely to represent the information focus of the sentence than other types of tokens in the sentence. Thus, if the j-th token is a Type 1 token then the parameter "token_j_count" is incremented by 1 (step 545). Similarly, values of weighting coefficients for other token types can be exemplarily set as $W_2=0.9$; $W_3=0.8$; $W_4=0.7$; $W_5=0.6$; $W_6=0.5$; $W_7=0.4$ for the corresponding types of tokens in accordance with the decreased likelihood that a token may represent the information focus of the sentence.

The parameter of token_j_count is incremented by the weighting coefficient Wi if the token is of type i.

If a parser is not used (step 550), as a follow up to a negative answer to the question in the step 520, the sentence bypasses the parsing and the token type and weighting coefficient assignment process from step 525 to step 545.

When this is the case, first, for the tokenization of the sentence, other methods such as single-word tokens or multi-word n-gram methods can be used (step 550).

Then, for each token in the sentence, the parameter "token_j_count" is simply incremented by 1 if the j-th token occurs in the sentence at least once (step 555). Optionally, this case of not using a parser can be treated as a special case of using the parser where the parser does not label the token with any grammatical role, and a special token type, such as type 8, can be assigned to the token to indicate that no grammatical roles are distinguished, so that all occurrences of the token are treated the same, and the weighting coefficient of type 8 token can be assigned the value of 1.

After all tokens in the sentence are counted, the parameter "sentence count" is next incremented by 1 (step 560). The parameter "sentence count" tracks the total number of sentences that passes the step 520, each of which may include potential topic terms as the information focus associated with the document collection.

Steps 510 to 560 are repeated until all the sentences in the paragraphs and the documents are finished (step 570). The document-internal term prominence for the j-th token is the cumulative "token_j_count" divided by "sentence count" that is the total number of the sentences in the document (step 580). Internal term prominence for the j-th token ITP_j has a value between zero and one using the above exemplified counting methods.

As is with the production of external term prominence data, it should be noted that Token Type definition can include different variations, and the weighting coefficient W can be assigned different values, as long as they are consistent with the methods used in producing the external term prominence data.

Also as is with the production of external term prominence data, in some embodiments, the text unit for counting tokens and computing ITP can be paragraphs or documents instead of sentences, as long as they are consistent with the methods used in producing the external term prominence data.

In some embodiments, a single type of tokens, such as type 1, or a mix of a selected number of token types can be used without also using other types of tokens for the purpose of calculating the term prominence. One exemplar case for such a choice is when only the most likely topic terms need to be identified, such as type 1 or type 2 tokens.

With the internal term prominence data obtained from the above steps, and the external term prominence data available from the data set in FIG. 4A and FIG. 4B, the document-specific term prominence (DSTP) for the jth token as a potential topic name is calculated (step 590) using the internal term prominence for the j-th token (ITP_j) obtained in step 580 (FIG. 5) and the external term prominence for the j-th token (ETP_j) obtained from the data set 215 (FIG. 2).

Again, depending on the use of parser and depending on the text units being either sentences or paragraphs or entire documents, only the corresponding data in the data set in FIG. 4A should be used.

In some embodiments, customized weighting coefficient values can be used instead of the default values that are used in the production of external term prominence data set. In such cases, the data in FIG. 4B can be used with the customized weighting coefficient values with the raw data for each token type to re-calculate the external term prominence data for the use of producing the document-specific term prominence value.

In some embodiments, the document-specific term prominence (DSTP) for a jth token is computed by the following equation:

$$DSTP_j = ITP_j - ETP_j \qquad \text{(Eqn. 1)}$$

Using this method, the DSTP value for a token or a term can be in a range between −1 and 1. It should be noted that although a DSTP value can be −1 for a token, when the data for the external term prominence is in a large enough quantity and truly from random sources, most of the negative DSTP values tend to be slightly below zero. Thus, in some embodiments, negative DSTP values can be assigned to zero so that DSTP always has a value range between 0 and 1.

In some other embodiments, the document-specific term prominence DSTP can be calculated using different formulae from the above, for example, using a formula:

$$DSTP_j = ITP_j * ITP_j / (ITP_j + ETP_j) \qquad \text{(Eqn. 2)}$$

One beneficial feature of the formula in Eqn. (2) is that DSTP does not have negative values.

Whether the embodiment is using sentences as the text units, or the paragraphs or documents as text units, the final document-specific term prominence DSTP is compared with a preset threshold value (step 595). Terms of which the DSTP value is greater than the preset threshold can be selected as the prominent topic terms of the document, and can be output as a topic list to the user interface or storage as shown in module 280 (FIG. 2).

Figure 6:
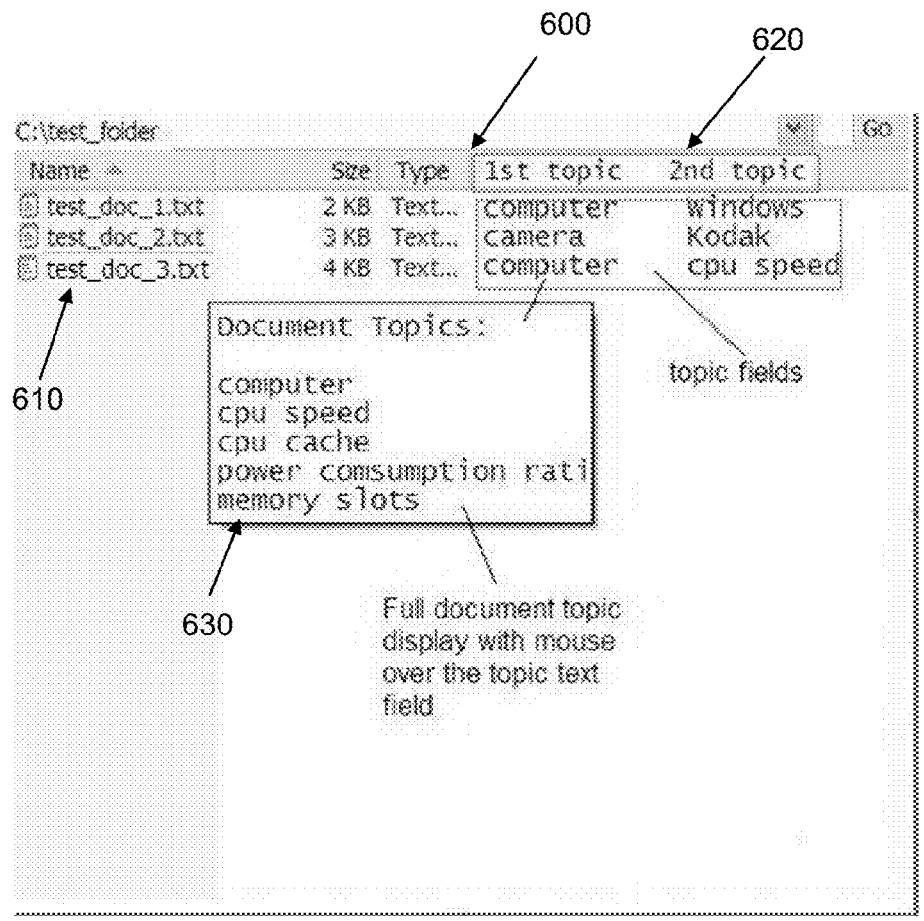
FIG. 6 is an exemplar user interface showing words or phrases displayed as topic terms or keywords in individual documents.

A list of topic terms identified in a document using methods described above can be used to highlight the content or the main subject matter of the document. Referring to FIG. 6, a list of files 610 are displayed in a file directory 600. In addition to file names, file sizes, file types, the most prominent topic terms 620 in the files can be extracted and displayed in metadata fields such as "keyword". When a user clicks on a file name, a pop-up window 630 can appear to show a list of topic terms in that file.

FIG. 7 shows a user interface 700 that lists emails in a user's email folder. In addition to commonly displayed information such as senders' names (i.e. "from"), subjects, dates, and sizes, the topic terms 710 extracted from the content of emails are displayed as keywords 720 in association with respective emails.

Other applications of displaying topic terms for a document are also disclosed in U.S. Provisional Patent Application 61/298,422, filed Jan. 26, 2010, and U.S. patent application Ser. No. 12/782,545, filed May 18, 2010, by the present inventor, It should be noted that the present disclosed methods are applicable to discovering topics in a portion of a document, a single document, or a collection of documents. Furthermore, the term prominence values of documents can be used as effective criteria to accurately rank documents in a search result from a search engine, or from any other information retrieval systems.

Document Indexing, Search, Retrieval, and Ranking Based on the Information Focus of the Documents Conventional methods for document indexing and its related search, retrieval and ranking are usually based on simple statistical information such as the frequency of the keyword in the documents. The frequency of keywords alone, however, is not always a reliable indicator of the document's relevancy to the search request. For example, an exemplar document D may consist of the following text.

"The camera is a new model that uses a rechargeable battery. It comes with a battery charger. But it can also use a non-rechargeable battery, so you don't need to carry the battery charger with you."

In this document, the most frequently used word "battery" occurred four times. However, it should be apparent to an ordinary English reader that the main topic or the information focus of the content is more about "camera" than about "battery". With conventional frequency-based approaches, this document will be considered more relevant to a query for "battery" than to a query for "camera" due to the relatively higher frequency of the keyword "battery", but it is apparent that the document provides more relevant information about "camera" than about "battery", even though the word "camera" occurred only once.

A key issue associated with the conventional approach is that it often cannot identify the correct information focus and thus cannot produce accurate search results.

In information retrieval, a common method of indexing terms in a plurality of documents is to first build a document term vector for each individual document, and then build a so-called "inverted index" by combining the individual document term vectors, such that, each term in the inverted index points to all the documents that contain this term, and when a term is queried, all documents that contain this term can be retrieved, and the results can be ranked according to a relevance measure of the document to the queried term.

FIG. 8A shows a conventional document term vector for a particular document with a term frequency vector corresponding to each term in the term vector. FIG. 8B is an exemplar format of a conventional inverted index for a document collection. In the inverted index, each term has a corresponding list called a posting, which contains the names or ID numbers of documents that contain the term, together with a frequency count of that term in the document. In this example, the frequency of the term is separated from the corresponding document name by a colon.

When a term, such as "computer" is queried, the system looks up the term "computer" in the inverted index in FIG. 8B, and retrieves the list of documents from the posting list of the term "computer", and ranks the documents in the output search result mainly based on the term's frequency as a measure of the relevancy of the document to the query. In such an approach, a document that contains more occurrences of the term "computer" will usually be ranked higher than a document that contains less occurrences of the same term or keyword.

The conventional frequency-based approach is simple and intuitive, but the results are often inaccurate and unreliable.

The presently disclosed system and methods take a different approach in determining the relevancy of a document to the search query. The presently disclosed system and methods look at the information focus of the document; build an index of the documents based on the information focus of the documents; and in serving a query for information, retrieve and rank the documents according to the strength of such information focus.

As described above, each term in a document can have a document-specific term prominence score DSTP. The topic list of a document produced using the present methods can include all unique terms in the document. Each unique term in the document has a term prominence score as a measure of its strength of being an information focus in the document. This topic list can be viewed as a document index or a document term vector. The term prominence scores associated with each term in the term vector can form a corresponding vector called "score vector".

In the present invention, the term prominence values are used in the document vector and the corresponding inverted index. For illustration purpose, the "term prominence value" can also be interchangeably called the "information focus score" hereafter.

FIG. 9A shows a document term vector based on the topic list produced from a document by the presently disclosed methods, and a corresponding "information focus score vector" consists of term prominence scores for the terms in the document term vector. Optionally, the scores can be normalized by a certain criterion.

FIG. 9B shows an inverted index based on a collection of document term vectors as exemplified in FIG. 9A, which shows information focus score in each term's posting list. In comparison with the conventional approach (FIGS. 8A and 8B), a high frequency of a specific term in a document does not necessarily correspond to a high information focus score for the same document.

Figure 10:
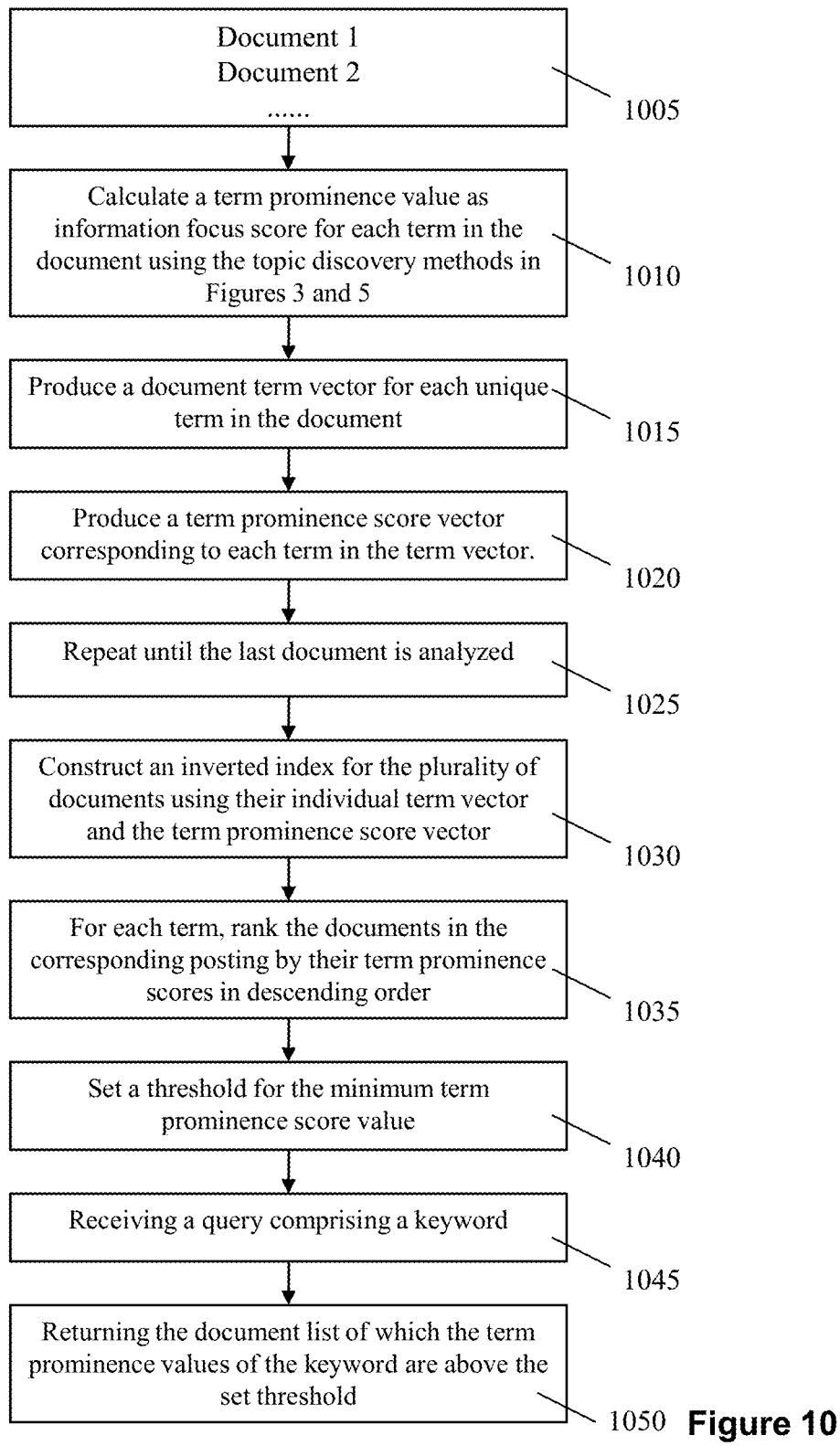
FIG. 10 is an exemplar flow diagram illustrating the process of indexing documents for search and ranking the search results using the topic discovery method in accordance with the present invention.

FIG. 10 illustrates detailed steps for ranking a plurality of documents in response to a specific query that matches a term in the inverted index. A plurality of documents are retrieved (step 1005). A term prominence value as information focus score is calculated for each term in each of the plurality of documents using the topic discovery methods in the present disclosure (step 1010). A document term vector for each unique term in a document is produced (step 1015). A term prominence score vector corresponding to each term is also produced (step 1020). The steps 1010 to 1020 are repeated until the last document is analyzed in step 1025.

An inverted index for the plurality of documents is constructed using their individual term vectors and the term prominence score vectors (step 1030). For each term, the documents in the corresponding posting are ranked by their term prominence scores in descending order (step 1035). A threshold is set for the minimum term prominence score value (step 1040).

When a query is received, a keyword in the query is identified (step 1045). If the keyword is matched with a term, the document list of which the term prominence values are above the set threshold are returned as the results to the query (step 1050). If no match is found, a "document not found" message is returned.

The search results (step 1050) are now ranked by the term prominence scores of the matched keyword in the documents, based on the information focus the term represents in the documents. The results using this method are more relevant to the user's query than the conventional methods that rank the results mainly based on term frequency.

It should be noted that the above description serves as an example for the presently disclosed system and methods. Other cases such as multiple term queries can also be handled in the same spirit of the present disclosure.

Producing and Displaying Section-Based Summaries for Documents

The presently disclosed system and methods can be used to identify prominent topic terms in a portion or a sub-segment of a document. In the present disclosure, a sub-segment of a document is treated as a special case of a full-length document object. The above described system and methods for topic discovery in a full-length document can be recursively applied to sub-segments of the document. This extension further enables a wide range of applications.

Different segments within a document can be identified by their formats. For example, many documents are internally written with different types of so-called markup languages, such as HTML, SGML, XML, etc., that contain information about the boundaries of segments inside the document, such as the "title", "heading", "body", etc. Other document segments may be specially marked by the authors with section headings of "Abstract", "Introduction", "Conclusion", and "Bibliography", etc. The presently disclosed system and methods can be readily applied to such sub-segments so that information focus of such segments can be identified and presented to the user for efficient information search or quick evaluation before committing time and effort to reading the entire content. In other examples, a page of a document, a section or a chapter of a book can also be treated as a segment of the document.

Figure 11A:
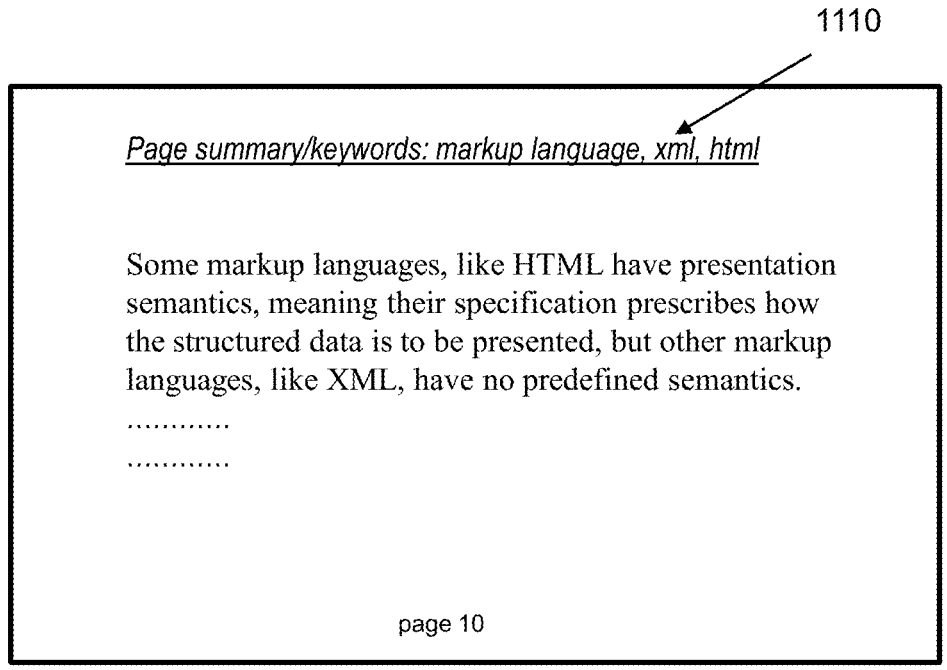
FIGS. 11A and 11B show examples of summaries with keywords for each page of a multi-page document in accordance with the present invention.
Figure 11B:
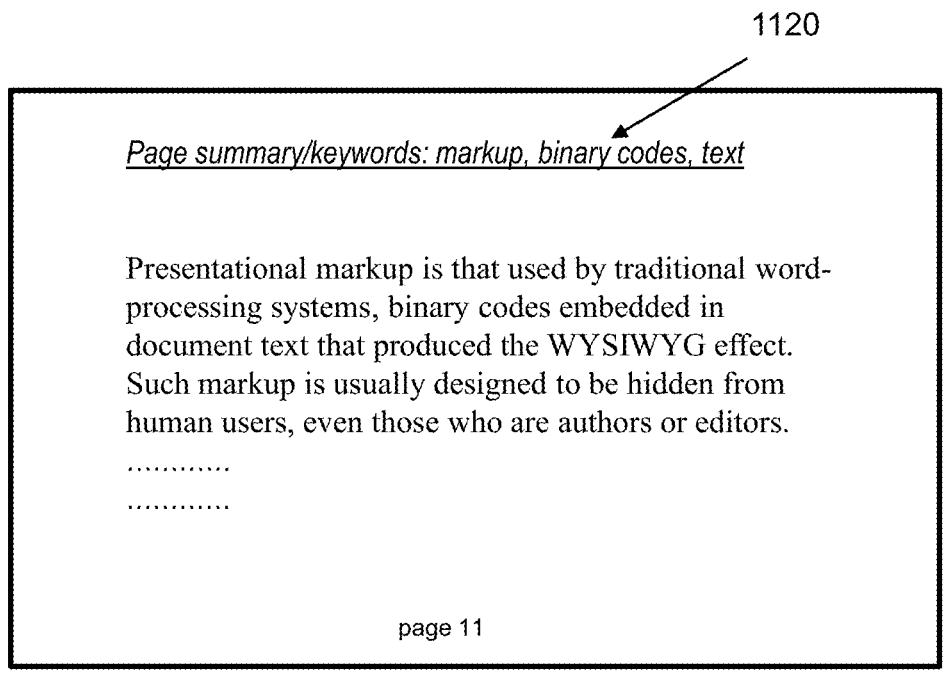

The presently disclosed system and methods can provide a section-specific summary or a keyword list to a document segment. FIGS. 11A and 11B illustrate keywords that contain the most prominent topic terms being displayed or printed on the top part or the header position of each page of a document. In this case, each page (e.g. Page 10 or Page 11 in FIGS. 11A and 11B) is treated as a sub-segment of the document. A user can take a glance at the summary line to decide if the content of the page may be of interest or not.

Some document are well-sectioned documents, such as patent documents, which usually have well-defined sections such as "abstract", "background", "summary of invention", "detailed description", and "claims". Often the abstract does not provide enough or pinpointing information about the main content, and the user may need to read more content to get an idea about the main topics of the disclosure, which can often be a time-consuming process. However, a summary line 1110 or 1120 consisting of either a list of keywords or a few sentences can be displayed or printed on the top part of each section. The keywords and sentences contain the most prominent topic terms. A user only needs to take a glance at the summary line of each section for an initial evaluation of the relevance of the contents.

Figure 12:
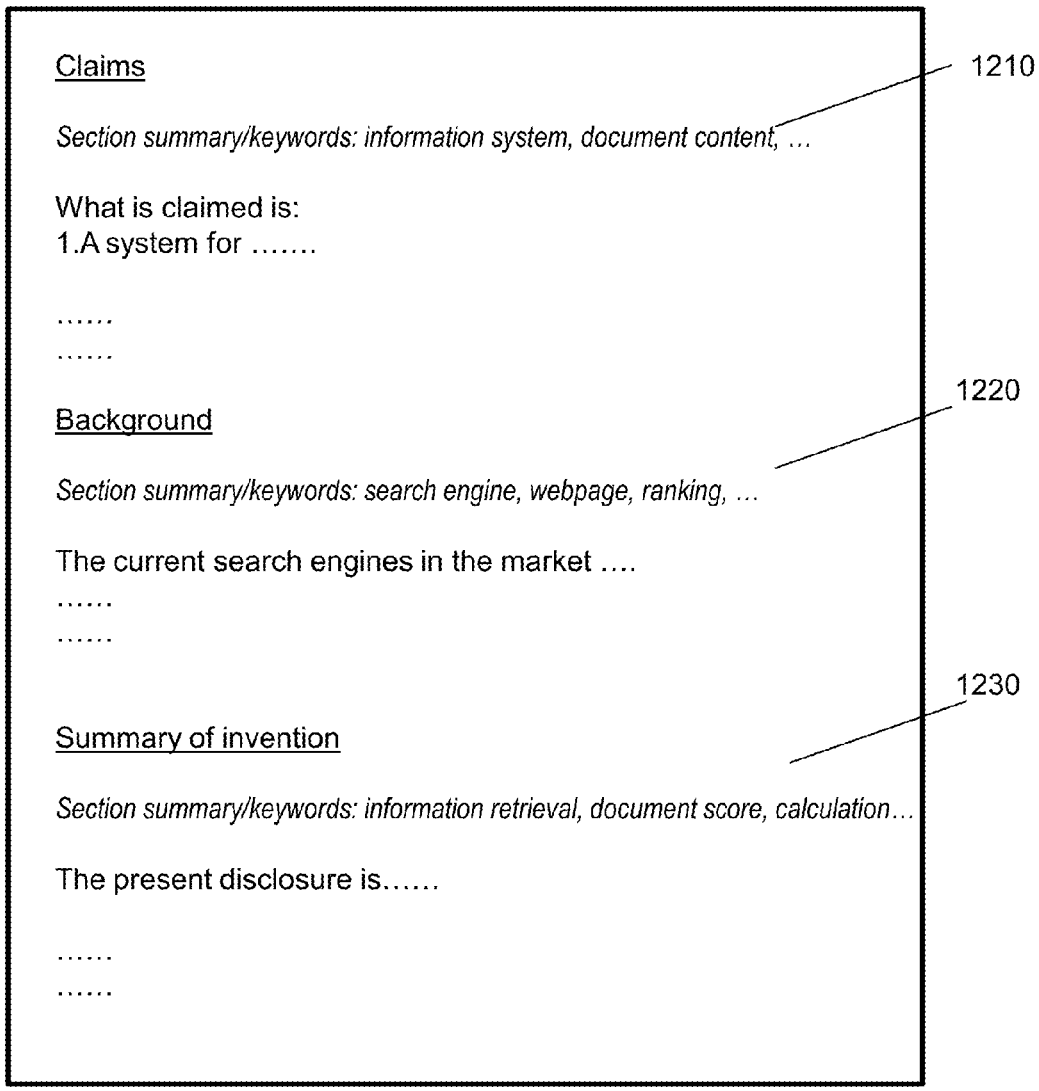
FIG. 12 is an exemplar product of displaying a separate summery/keyword line for each section or segment of a multi-section document in accordance with the present invention.
Figure 13:
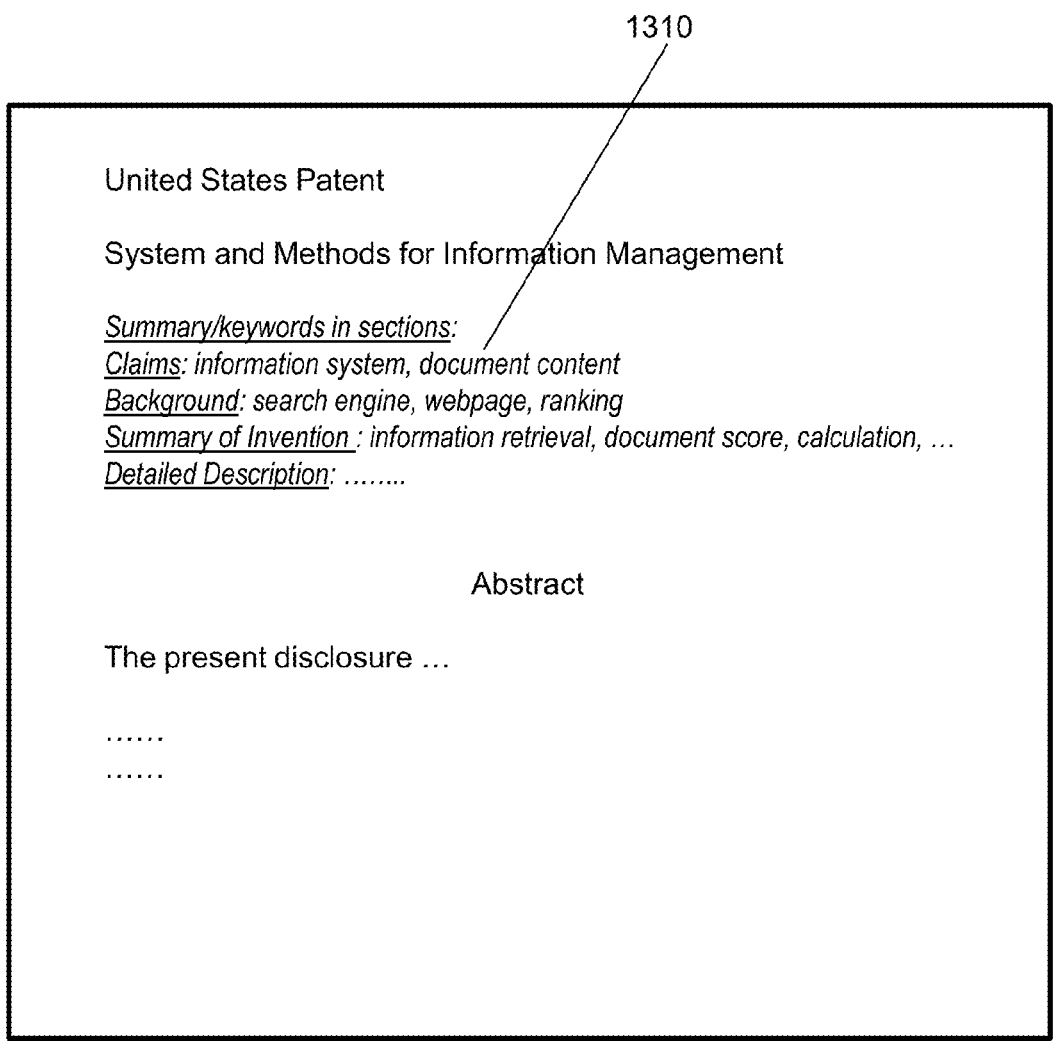
FIG. 13 is an exemplar product of displaying combined summery/keyword lines for each section or segment of a multi-section document in accordance with the present invention.

FIG. 12 is an example of such section-based summary lines 1210, 1220, 1230 displayed at the top part in each section of a hypothetical patent document. A summary for the entire document can be obtained by combining the summary lines 1210, 1220, 1230 for different sections 1310 (Claims, Background, and the Summary of Invention, etc.) as shown in FIG. 13.

Conventional Internet searches usually display a portion of the content of the web pages in the search results. However, the displayed portion of a page may not necessarily provide enough information about the entire content of the page.

Figure 14:
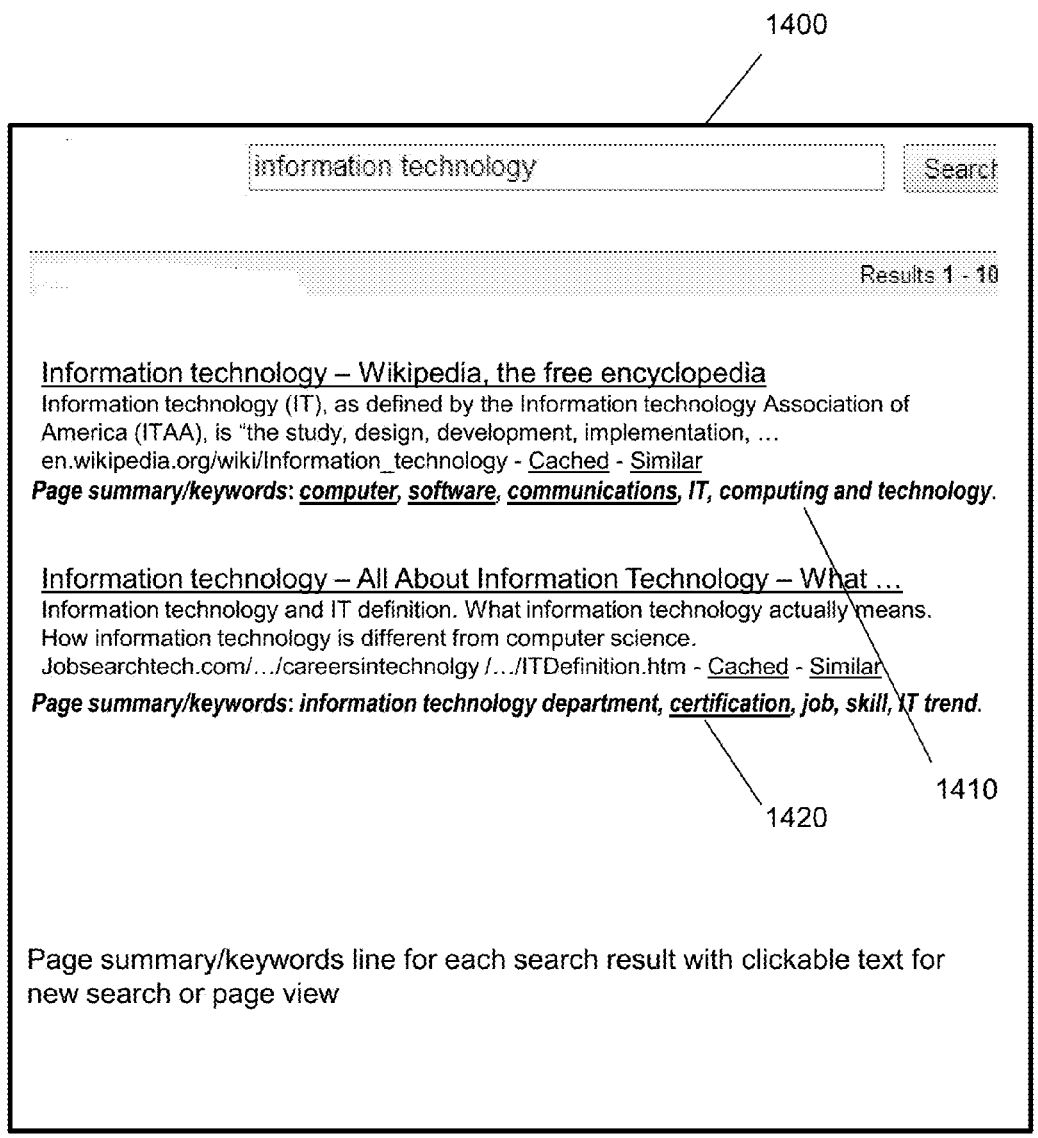
FIG. 14 is an exemplar product of displaying a page summery/keyword line for each Webpage returned in response to an Internet search in accordance with the present invention.

In the present invention, referring to FIG. 14, the summary or topics for a web page 1400 can also appear on the search result page of an Internet search. A list of prominent topic terms or sentences containing such terms is exemplarily displayed at the bottom part of each search result, so the user may take a quick look at the summary before clicking on the returned link to review the full page. The summary lines 1410 and 1420 allow users to immediately have a quick idea about the main topics of the page before committing more time and effort to reviewing the whole page. In the specific example in FIG. 14, the brief content provided the conventional search engines (known as the "teaser text") is from a small part of the page that has the best match with the query for "information technology". That part briefly talks about what information technology is about. However, the main content of the page is about the jobs in the information technology field, and this can be captured by the summary/keywords line produced by the presently disclosed system and methods. Thus, if a user is looking for information about what "information technology" is about, he/she can skip the link in 1420 without spending time in opening the page and reading the whole content. On the other hand, if the user is looking for job information in the information technology field, he/she can skip the link in 1410 to save time.

Furthermore, the terms in the summary line can be anchors of hyper text links so that if the user finds such terms to be of greater relevance or interest to the original query, he/she can click on the terms to either go to a linked page, or automatically launch a new search with that term as the query term.

The same method can be applied to other types of searches, such as the enterprise search, desktop search, or any other search, without deviating from the principle of the present invention.

Another example for producing and displaying section-based keywords or summaries is with emails. Conventional email systems display the emails in the user's Inbox or another folder as a list of headers or rows of metadata in the user interface that include columns such as "Sender", "Date", "Subject", "Size", etc., and require the user to select or open a particular email from the list to see the full messages of the email. When composing an email, the user usually follows the convention of writing a brief line of text in the "Subject" field, to indicate what the message is about. This field is very useful for the receiver to have an idea about the main topics of the email at a glance, and also offers the user to sort a list of emails by the alphabetical order of the words used in this field, such that emails of the same subject can be grouped together for quick action, such as review, moving, or deletion. However, there are often times when the text in the "Subject" field loses its subject-highlighting function.

One such case is that the user may not correctly phrase the intended subject matter.

Another case, which can be more often than the first case, is that once an email is initiated, it may form a thread from the receiver(s) and sender(s) replying to each others. Often, as the thread continues, the content of the email may shift to other topics that are different from what the original text in the "Subject" describes, and often, neither the sender(s) nor the receiver(s) may notice that the text in the subject field is no longer pertinent to the content, or even if they do notice, often they do not bother to change the text in the Subject field to reflect the latest topics. This natural tendency often creates a problem when the user wants to locate a particular email among a multitude of emails that have the same Subject text. The user may have to open each of such emails to see if one of them contains the information he/she is looking for. The user may also need to perform a full text search with the particular text as the keyword in the message body, but this is not always effective as well. One of the cases is that often the email system may offer by default a feature of including the original message in the reply, thus, when the thread gets long, the same text may be repeated in many of the messages that have the same text on the Subject line. When this is the case, even if the search finds the text, the messages that contain the text can still be a long list, and the user may need to spend time going over many unrelated messages or texts in the message body before he/she can locate the content that is being looked for.

FIG. 15A is an exemplar case of a conventional email Inbox in a user interface. This example shows an email thread with the Subject of "Healthy food info" started by the original sender, and was responded by a number of recipients during a period of over a month. In the conventional display, the reader cannot know from the header lines of the messages what type of new information each of the replies in the tread contains. Hypothetically, in replying to the thread, each recipient added new information, but the original topic about healthy food gradually shifted to other health-related topics such as food safety, food wrapping, then to water quality, then to exercise, etc. If the user wants to review the newly added information about water filter, he/she may need to open each email and read the content of all the emails.

The presently disclosed system and methods can be used to identify and display topics in email threads, forum threads, and other incremental information contents. Topic terms in a section of an email thread can be identified and displayed. In particular, new additional topics in the reply portion of an email thread can be extracted to show new information contained in the email responses.

The present invention first identifies the recently added text in an email thread, then applies the methods of topic-discovery as described above to identify the main topics of the recently added text, then, it adds a special column in the folder view or list view of the email user interface, with a column heading such as "New Topics" either before or after the Subject column, and displays the most prominent topic terms (words or phrases or sentences) extracted from the recently added content in the thread, (whether the original message is included or not). This provides an effective solution to the two problems described above. First, if the user's original text in the Subject line does not correctly reflect the content, the topic terms from the content can provide additional information about what is actually being talked about in the content. Secondly, and often more importantly, the user can immediately know from the topic terms in this field if the subject of the original thread is changed or not, and if a user needs to locate a particular new content from a long thread of emails that all have the same text in the Subject line, the user can take a quick look at the "new topics" column, without having to open each of such message and read it through, or without having to perform a full text search and still having to spend time locating the information from a long list of search results, especially when they contain the queried text as a result of the users having included and accumulated the original messages in their replies multiple times.

Referring to FIG. 15B, the main topics of newly added content in each reply are identified and extracted, and an additional column of "New Topics" is added to the user interface, in which the main topic terms in the newly added content in the replies are displayed next to the original Subject field. Form the exemplar case shown in FIG. 15B, it can be seen that the topic naturally shifted from "Healthy food info" to "weekend exercise", including intermediate topics of food safety, water quality, etc. This provides an efficient way for the user to easily locate the information among a long list of possible candidates.

In identifying the new topic terms and displaying them to the user interface, the system and methods in the present disclosure first identify and extract the recently added text in an email. In the case of the first email in the thread, this is the original text the sender writes. In the case of a reply and the subsequent replies in the thread, the system and methods in the present disclosure identify various types of information indicating the boundaries of the recent incremental content. One exemplar indication is the timestamps in the message header. In this exemplar case, the system locates the message body text between the recent timestamp and the next recent timestamp. If the system does not find a second timestamp, then it treats the message as the initiating message and extracts the entire text from the message body for analysis.

The system then applies the methods in the present disclosure as described above to identify the main topics of the recently added text, and then, it populates the special column of "New Topics" 1510 with the topics terms in the corresponding email.

In some embodiments, the heading of the new column can be "New Topics". In some embodiments, the heading of the new column can be "The latest topics", and in yet another embodiment, the column heading can be "New Subject". The new column can be positioned either before or after the original 'Subject' column in the folder view or list view of the email user interface.

The topic terms in the column can be sorted in different orders, such as the alphabetical order, so that the user can easily locate the content without performing a search. This is particularly useful when the user does not know or does not remember what exact keyword to use when performing a full text search.

It should be noted that the above system and method of identifying the particular or the recent incremental content and the information focus of such content and displaying such information to the user can be applied to other incremental contents, such as Web-based forums, discussion groups, and blogs.

User Interface for Highlighting Content to Facilitate Document Search

Conventional methods of displaying information about documents or emails are not capable of highlighting the content of the documents by automatically extracting such key information. Some conventional methods display a part of the document information known as "metadata" that are based on the system-generated information such as the time the document is created, modified, or the time an email is received, and its size, author/sender, etc., rather than based on user-created contents. Other conventional methods extract the first few characters or words of a document or email and display them in a way commonly known as "preview". But none of these conventional methods can perform a content analysis and identify the main topics of the documents or emails by looking at the context, or grammatical role or structure, or the related frequency of the terms in the document.

In contrast, the present disclosure provides a method and user interface of content-highlighting to facilitate the search of needed documents by automatically displaying a term or a summary for a document, or a document segment, or a document collection based on one or more elements extracted from the user-created content, using a method that determines the importance of such elements such as a word or a phrase or a sentence, etc., based on the context, or the grammatical role or structure, or the related frequency of the elements in the document, rather than based on the position of the elements such as at the beginning of the document or at a random position in the document, or based on system-generated information such as the conventional metadata.

In U.S. patent application Ser. No. 12/715,385 filed by the present inventor, a system and methods and user interface are disclosed that use a topic-discovery methods to identify the topic terms of a document, an email, a collection of documents or emails, and display such topic terms to the user in a user interface. In the present disclosure, the concept of documents is further extended to include the sub-segments of documents of various types including emails and other documents as described above, and the methods of identifying the topic terms and displaying such topic terms and summaries are also extended to such segments.

Both the present disclosure and the aforementioned disclosure also provide methods for determining the importance of such elements as described above.

The present disclosure further generalizes the method and user interface for highlighting the key information of the content with automatically extracted keywords or summaries.

Figure 16:
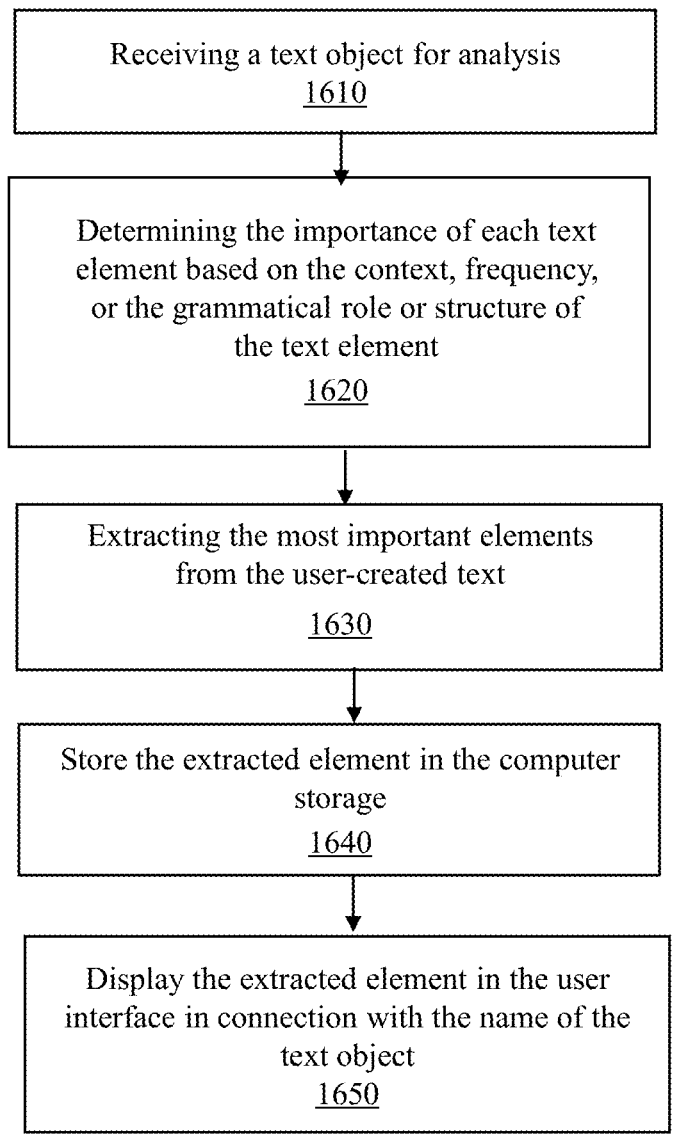
FIG. 16 is a flow diagram illustrating the process of identifying and displaying the important text elements in text content and displaying such text elements.

FIG. 16 shows a flowchart for identifying and displaying the important text elements in a text object. A text object is a general term for documents of various types, including regular documents with text, and emails and web pages, and their sub-segments, and a collection of multiple instances of such documents or emails, or sub-segments, etc. A text object containing user-created content is received (step 1610). The importance of each element in the text object, such as a word, a phrase, etc., is determined based on the context, or frequency, or the grammatical role or structure of the text element (step 1620). The important text elements are extracted (step 1630). The extracted text elements are stored in a computer storage device, such as the hard disk or memory or both (step 1640), and displayed in a user interface in a way that is related to the name of the text object, such as in the form of a tag, a label, or a summary of the content of the text object (step 1650).

Searching Emails by New Text Segments in the Emails

The present invention can provide fast and accurate search of emails as a special type of documents, and for reducing or avoiding processing the same content multiple times. The present system can selectively index only the recently added content in the message body, excluding the previously included text. This can significantly reduce system load and processing time, and provides a faster search of the intended text.

Figure 17:
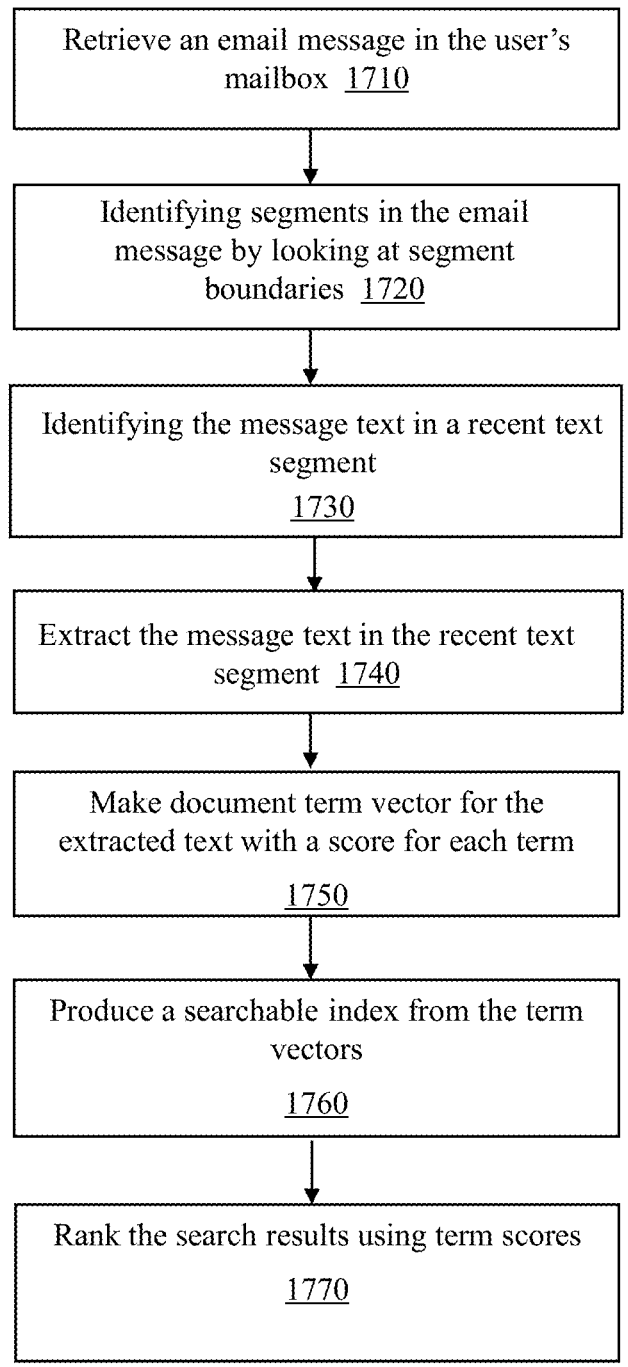
FIG. 17 is a flow diagram illustrating the process of searching by new text segments in emails.

FIG. 17 illustrates a flow diagram for identifying topics in new message content, particularly in a thread of email messages. An email thread includes a series of email messages in reply to each others. In the present system, an email message is received (step 1710). The sub-segment can for example be the recently added content in the email message body that may or may not include text from previous emails. The system first detects the boundaries of the most-recent segment (step 1720) using timestamps of email responses in an email thread. The system then extracts the content in the identified segment (step 1730), and treats the extracted content as a standalone document (step 1740). A document term vector is created for the extracted content (step 1750). The method produces a searchable index of the emails in the user's mailbox for only the newly-added text in each email without the included texts (step 1760). In one implementation, this index can be used as a secondary index to the conventional index which includes all texts in all emails in the user's mailbox. The search results from the segment index can be ranked using term prominence values (step 1770). Alternatively, the relevance ranking of the segment indexes can also be based on conventional ranking methods.

Producing a Topic List for a Document Collection from the Topic Lists of Individual Documents The presently disclosed system and methods can identify topic terms in a collection of documents using topic lists produced from individual documents.

In some embodiments, for a document collection containing N documents, the presently disclosed system and methods first produce the topic term list for each individual document as described above. Then, for each specific topic term, the system and methods count the number of documents this term occurs in and calculate a cumulative sum of the term prominence score from each individual score associated with each document the term occurs in. Then the cumulative sum is divided by the total number of documents the term occurs in. The resulting average term prominence score can be used as the term prominence score of that term in the entire document collection. The process is repeated for each term in the document collection, and a candidate topic list can be compiled from all terms in the document collection. A threshold can be determined to select those that have the prominence value above the threshold. Then the selected term list is sorted in descending order by the prominence score, and output as the topic list of the document collection.

A topic list of a document collection can be used as pre-written queries for searching the needed documents in the collection, and as category nodes for categorizing the document in the collection. Detailed methods for the application of such a topic list is disclosed in U.S. patent application Ser. No. 12/782,545, filed May 18, 2010, by the present inventor. It should be noted that browsable search by a topic list is applicable to individual documents, a collection of documents, and sub-segments of an individual document.

What is claimed is:

1. A computer-implemented method for determining term importance in a text content for information discovery and presentation, comprising:

receiving a text content;

tokenizing the text content into a plurality of terms, each term comprising one or more words or phrases;

identifying a first term in the text content, wherein the first term is or is contained in a grammatical subject of a sentence;

identifying a second term in the text content, wherein the second term is or is contained in a non-subject portion of a sentence;

using, by a computer, a pre-defined criterion for determining whether the first term is of greater importance than the second term, or whether the second term is of greater importance than the first term;

associating a first importance measure to the first term based on the pre-defined criterion;

associating a second importance measure to the second term based on the pre-defined criterion;

further determining the first importance measure based on a comparison between a frequency of the first term inside the text content and a frequency of the first term obtained from a document external to the text content, or further determining the second importance measure based on a comparison between a frequency of the second term inside the text content and a frequency of the second term obtained from a document external to the text content;

selecting the first term in preference over the second term if the first importance measure is greater than the second importance measure, or selecting the second term in preference over the first term if the second importance measure is greater than the first importance measure;

performing an action associated with the selected term, wherein the action comprises at least outputting an element associated with the selected term, displaying an element associated with the selected term, or using an element associated with the selected term for a computer-assisted operation associated with the text content including ranking a search result, wherein the element is selected from the group consisting of at least the selected term, the first importance measure or the second importance measure, and a sentence or paragraph containing the selected term.

2. The method of claim 1, wherein the first term is determined to be of greater importance than the second term, and the first importance measure is greater than the second importance measure.

3. The method of claim 1, further comprising:

counting a first frequency of the first term in the text content, wherein the first importance measure is determined further based on the first frequency; or counting a second frequency of the second term in the text content, wherein the second importance measure is determined further based on the second frequency.

4. The method of claim 1, wherein the text content comprises an element selected from the group consisting at least of a single document, a collection of documents, a document segment marked by a boundary or by a section heading, a page of a multi-page document, a paragraph, a sentence, a portion of text in documents of different types including a regular document, an email or a message, a webpage or article, or a book.

5. The method of claim 1, when the element is output or displayed, the display format or the function of the element includes at least a tag or a label associated with the text content, a topic term or a summary text associated with the text content, a category name or category node, or a search query.

6. The method of claim 1, wherein the text content is made searchable using a query, or is associated with a search index, the method further comprising:

receiving a search query comprising a keyword;

matching the keyword with the first term or the second term;

returning the text content as a search result or part of a search result; and ranking the search result based at least on the first term importance measure or the second term importance measure.

7. A computer-implemented method for determining term importance in a text content for information discovery and presentation, comprising:

receiving a text content;

tokenizing the text content into tokens as instances of terms, each token or term comprising one or more words or phrases;

identifying a term with multiple token instances in the text content;

identifying a first token instance of the term, wherein the first token instance is or is contained in a grammatical subject of a sentence;

assigning a first importance value to the first token instance for being or being contained in a grammatical subject of a sentence;

identifying a second token instance of the term, wherein the second token instance is or is in a non-subject portion of a sentence;
assigning a second importance value to the second token instance for not being or not being contained in a grammatical subject of a sentence, wherein the second importance value is different from the first importance value;
determining an importance measure for the term based on the sum of the first importance value and the second importance value;
performing an action associated with the term if the importance measure is above a threshold, wherein the action comprises at least outputting an element associated with the term, displaying an element associated with the term, or using an element associated with the term for a computer-assisted operation associated with the text content including ranking a search result, wherein the element is selected from the group of elements consisting of at least the term, the importance measure, and a sentence or paragraph containing the term.

8. The method of claim 7, further comprising:
counting a first frequency of the first token instance in the text content, wherein the first importance value is determined further based on the first frequency; or
counting a second frequency of the second token instance in the text content, wherein the second importance value is determined further based on the second frequency.

9. The method of claim 7, wherein the importance measure for the term is determined based on a comparison between a frequency of the first token instance or the second token instance inside the text content and a frequency of the first token instance or the second token instance in contents external to the text content.

10. The method of claim 7, when the element is output or displayed, the display format or the function of the element includes at least a tag or a label associated with the text content, a topic term or a summary text associated with the text content, a category name or category node, or a search query.

11. The method of claim 7, when the text content is made searchable, or is associated with a search index, the method further comprising:
receiving a search query comprising a keyword;
matching the keyword with the first term;
returning the text content as a search result or part of a search result; and
ranking the search result based at least on the first term importance measure or the second term importance measure.

12. A computer system, comprising:
a processor for executing instructions; and
a computer readable medium, coupled to the processor in operation, wherein the computer readable medium contains code modules of instructions that, if executed by the processor, are operable to cause the computer system to receive a query;
identify a first term in the query, wherein the first term comprises a word or a phrase;
match the first term with a search index associated with a plurality of documents, or with a searchable collection of documents, each document comprising one or more terms;
return at least a portion of the plurality of documents or document representations as a search result based on the query, wherein at least two of the documents in the search result contain or are associated with the first term; and
rank the search result based at least on a first score associated with the first term, wherein the first score is produced using a first groups of steps or a second group of steps,
wherein the first group of steps comprise:
(a) identifying a document in the plurality of documents,
(b) identifying a sentence containing the first term and a second term, wherein the sentence comprises a subject and a non-subject portion of the sentence,
(c) obtaining a pre-defined criterion for a computer program to determine whether the first term is of greater importance than the second term, or the second term is of greater importance than the first term based on whether the first term or the second term is contained in the subject or the non-subject portion of the sentence, and
(d) determining the first score based at least on the pre-defined criterion;
wherein the second group of steps comprise:
(e) tokenizing the document into tokens as instances of terms, each token or term comprising one or more words or phrases;
(f) identifying a first token instance of the first term, wherein the first token instance is or is contained in a grammatical subject of a sentence;
(g) assigning a first importance value to the first token instance for being or being contained in a grammatical subject of a sentence;
(h) identifying a second token instance of the first term, wherein the second token instance is or is in a non-subject portion of a sentence;
(i) assigning a second importance value to the second token instance for not being or not being contained in a grammatical subject of a sentence, wherein the second importance value is different from the first importance value;
(j) determining the first score for the first term based on the sum of the first importance value and the second importance value.

13. The computer system of claim 12, when the first group of steps are used,
the first score is determined to be greater when the first term is contained in the subject than when the first term is in the non-subject portion of the sentence.

14. The computer system of claim 12, when the second group of steps are used, the first importance value is determined to be greater than the second importance value.

15. The computer system of claim 12, when the first group of steps are used, the first score for the first term is determined further based on a first frequency of the first term in the text content.

16. The computer system of claim 15, when the first group of steps are used, the first score for the first term is determined based on a comparison between the first frequency of the first term in the text content and a frequency of the first term in contents external to the text content.

17. The computer system of claim 12, when the second group of steps are used, the first score for the first term is determined further based on a first frequency of the first term in the text content.

18. The computer system of claim 17, when the second group of steps are used, the first score for the first term is determined based on a comparison between the first frequency of the first term in the text content and a frequency of the first term in contents external to the text content.

19. The computer system of claim 12, wherein the first score for the first term is determined before the search result is produced.

* * * * *